(12) United States Patent
Li et al.

(10) Patent No.: US 12,262,371 B2
(45) Date of Patent: Mar. 25, 2025

(54) UPLINK TRANSMISSION METHOD BASED ON TRANSMISSION PRIORITY AND COMMUNICATION APPARATUS

(71) Applicant: Huawei Technologies Co., Ltd., Shenzhen (CN)

(72) Inventors: Shengyu Li, Beijing (CN); Lei Guan, Beijing (CN); Dan Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 581 days.

(21) Appl. No.: 17/499,553

(22) Filed: Oct. 12, 2021

(65) Prior Publication Data
US 2022/0039127 A1 Feb. 3, 2022

Related U.S. Application Data

(63) Continuation of application No. PCT/CN2020/084712, filed on Apr. 14, 2020.

(30) Foreign Application Priority Data

Apr. 15, 2019 (CN) .......................... 201910300776.8

(51) Int. Cl.
*H04W 72/1268* (2023.01)
*H04L 1/1812* (2023.01)
*H04W 72/23* (2023.01)

(52) U.S. Cl.
CPC ....... *H04W 72/1268* (2013.01); *H04L 1/1812* (2013.01); *H04W 72/23* (2023.01)

(58) Field of Classification Search
CPC ................................................. H04W 72/1268
See application file for complete search history.

(56) References Cited

U.S. PATENT DOCUMENTS

| 8,638,815 | B2 |  | 1/2014 | Earnshaw et al. |
| 9,565,006 | B2 | * | 2/2017 | Seo ........................ H04L 5/0055 |
| 11,190,324 | B2 | * | 11/2021 | Korhonen ............. H04L 1/1861 |
| 2016/0211962 | A1 | * | 7/2016 | Lee ............................ H04L 1/06 |
| 2019/0045527 | A1 | * | 2/2019 | Shimezawa ........... H04L 1/1854 |
| 2019/0223207 | A1 | * | 7/2019 | Huang ................... H04L 5/0053 |
| 2019/0254021 | A1 | * | 8/2019 | Hosseini ............... H04L 1/1812 |
| 2020/0053766 | A1 | * | 2/2020 | Chien ................... H04L 5/0053 |
| 2020/0205141 | A1 | * | 6/2020 | Khoshnevisan ...... H04L 5/0044 |
| 2020/0413425 | A1 | * | 12/2020 | Lin ........................ H04W 72/21 |
| 2022/0095337 | A1 | * | 3/2022 | Wang .................... H04L 5/0053 |
| 2022/0103304 | A1 | * | 3/2022 | Elshafie ................ H04L 1/1819 |

(Continued)

FOREIGN PATENT DOCUMENTS

| CN | 102123512 A | 7/2011 |
| CN | 107623950 A | 1/2018 |

(Continued)

*Primary Examiner* — Guang W Li
(74) *Attorney, Agent, or Firm* — Slater Matsil, LLP

(57) ABSTRACT

This application provides an uplink transmission method and a communication apparatus, to determine, based on a priority of a PUSCH, a logical channel set corresponding to the PUSCH, generate a MAC PDU based on the logical channel set corresponding to the PUSCH, and send the MAC PDU on the PUSCH. Based on this solution, a priority of an uplink data channel is associated with a logical channel, to provide a solution for mapping data of the logical channel to the uplink data channel.

18 Claims, 5 Drawing Sheets

(56) References Cited

U.S. PATENT DOCUMENTS

| | | | |
|---|---|---|---|
| 2022/0132535 A1* | 4/2022 | Lee | H04L 1/1854 |
| 2022/0174659 A1* | 6/2022 | Lu | H04L 1/1854 |
| 2023/0043279 A1* | 2/2023 | Ma | H04L 5/0087 |

FOREIGN PATENT DOCUMENTS

| | | |
|---|---|---|
| CN | 109392148 A | 2/2019 |
| EP | 3439395 A1 | 2/2019 |
| WO | 2011096742 A2 | 8/2011 |
| WO | 2011096742 A3 | 1/2012 |
| WO | WO-2018010673 A1 * | 1/2018 |
| WO | 2019022471 A1 | 1/2019 |

* cited by examiner

UPLINK TRANSMISSION METHOD BASED ON TRANSMISSION PRIORITY AND COMMUNICATION APPARATUS

CROSS-REFERENCE TO RELATED APPLICATIONS

This application is a continuation of International Application No. PCT/CN2020/084712, filed on Apr. 14, 2020, which claims priority to Chinese Patent Application No. 201910300776.8, filed on Apr. 15, 2019. The disclosures of the aforementioned applications are hereby incorporated by reference in their entireties.

TECHNICAL FIELD

This application relates to the communication field, and more specifically, to an uplink transmission method and a communication apparatus.

BACKGROUND

In long term evolution (LTE) and new radio (NR) wireless communication systems, when a terminal device needs to send data by using a physical uplink shared channel (PUSCH), the terminal device needs to obtain the data from at least one logical channel (LCH) based on an amount of data that can be carried on the PUSCH, to form at least one media access control (MAC) protocol data unit (PDU), and further include, on the PUSCH, a transport block including the at least one MAC PDU.

Currently, in NR uplink transmission, simultaneous transmission of a plurality of physical uplink control channels (PUCCHs) is not supported, and simultaneous transmission of both a PUCCH and a PUSCH is not supported. In time domain, when a plurality of PUCCHs overlap or a PUCCH overlaps a PUSCH, uplink multiplexing needs to be performed, where the uplink multiplexing is alternatively referred to as uplink control information multiplexing (UCI MUX). In addition, to enhance uplink multiplexing of ultra-reliable low-latency communication (URLLC), the concept of a priority of an uplink channel is proposed.

SUMMARY

This application provides an uplink transmission method and a communication apparatus. A priority of an uplink data channel is associated with a logical channel, to provide a solution for mapping data of the logical channel to the uplink data channel.

According to a first aspect, an uplink transmission method is provided. The method may be performed by a terminal device or a module (for example, a chip) in a terminal device. An example in which the method is performed by the terminal device is used for description below.

The method includes: determining a first logical channel set based on a first priority; generating a MAC PDU based on the first logical channel set; and sending the MAC PDU on a first uplink data channel. The first priority is a value of a priority of the first uplink data channel, the first logical channel set is a logical channel set corresponding to the first uplink data channel, and the first logical channel set includes one or more logical channels.

According to the uplink transmission method provided in this application, a priority of an uplink data channel is associated with a logical channel, the corresponding logical channel is determined based on the priority of the uplink data channel, and a MAC PDU may further be generated based on the determined logical channel and sent. This resolves a problem of mapping data of the logical channel to the uplink data channel after the priority of the uplink data channel is introduced.

With reference to the first aspect, in some implementations of the first aspect, the determining a first logical channel set based on a first priority includes: receiving a higher layer parameter sent by a network device, where the network device includes the first logical channel set.

Based on this solution, the network device may directly configure the priority of the first uplink data channel and the corresponding first logical channel set for the terminal device.

With reference to the first aspect, in some implementations of the first aspect, the determining a first logical channel set based on a first priority includes: determining the first logical channel set based on the first priority and a mapping relationship between a priority of an uplink data channel and a logical channel set.

It should be understood that the mapping relationship may include a plurality of mapping sub-relationships, and each mapping sub-relationship indicates that one priority of the uplink data channel corresponds to one logical channel set. In this way, a logical channel set corresponding to the first priority may be determined based on a mapping sub-relationship including the first priority, where the determined logical channel set is the first logical channel set.

Optionally, the mapping relationship may be preconfigured by the network device or stipulated in a protocol.

With reference to the first aspect, in some implementations of the first aspect, a first mapping sub-relationship and a second mapping sub-relationship are any two mapping sub-relationships included in the mapping relationship between a priority of an uplink data channel and a logical channel set, the first mapping sub-relationship is a mapping relationship between a second priority and a second logical channel set, the second mapping sub-relationship is a mapping relationship between a third priority and a third logical channel set, the second priority and the third priority are any two different values of the priority of the uplink data channel, and there is no intersection between the second logical channel set and the third logical channel set.

Based on this solution, there is no intersection between logical channel sets associated with different priorities of an uplink data channel, so that it can be ensured that data on different logical channels is carried on physical uplink data channels with different priorities, thereby implementing separate transmission between data of different service flows and different quality of service (QoS) requirements, and helping ensure stability and reliability of service transmission.

Further, the second priority is higher than the third priority, and a priority of any logical channel in the second logical channel set is higher than a priority of a logical channel with a highest priority in the third logical channel set.

Based on this solution, an uplink data channel with a relatively high priority is associated with a logical channel with a relatively high priority, thereby helping provide differentiated assurance on a delay and reliability.

With reference to the first aspect, in some implementations of the first aspect, an identifier (ID) of the logical channel in the first logical channel set is greater than or equal to a first threshold, or the ID of the logical channel in the first logical channel set is less than or equal to the first threshold. Alternatively, a priority of the logical channel in the first logical channel set is greater than or equal to the first threshold, or the priority of the logical channel in the first logical channel set is less than or equal to the first threshold. The first threshold corresponds to the first priority.

Based on this solution, the first threshold may be determined based on the first priority, and the first logical channel set may further be determined based on the first threshold. Therefore, the network device needs to configure, for the terminal, only the first threshold corresponding to the first priority. Compared with a solution in which the first logical channel set is directly configured for the terminal device, signaling overheads can be reduced.

Optionally, the first threshold may be predefined or may be configured by a higher layer.

With reference to the first aspect, in some implementations of the first aspect, the determining a first logical channel set based on a first priority includes: determining the first logical channel set based on the first priority and a mapping relationship between an ID of a logical channel and a priority set of an uplink data channel.

Specifically, the terminal device may determine an ID or a priority that corresponds to a priority set including the first priority and that is of a logical channel, and a set including logical channels corresponding to the ID or the priority that corresponds to the priority set including the first priority and that is of a logical channel is the first logical channel set.

In this solution, the mapping relationship between an ID of a logical channel and a priority set of an uplink data channel may be preconfigured or may be stipulated in a protocol. The terminal device may determine, by using the mapping relationship within specific duration, a logical channel set corresponding to any uplink data channel, and the network device does not need to indicate, for each uplink data channel by using signaling, a corresponding logical channel set, so that signaling overheads and implementation complexity can be reduced.

With reference to the first aspect, in some implementations of the first aspect, an element in a priority set, corresponding to an ID of a second logical channel, of an uplink data channel is greater than or equal to a second threshold, or the element in the priority set, corresponding to the ID of the second logical channel, of an uplink data channel is less than or equal to the second threshold, where the second threshold corresponds to the second logical channel, and the second logical channel is any logical channel in the first logical channel set.

Specifically, the terminal device may determine, based on the second threshold, an ID or a priority that corresponds to a priority set including the first priority and that is of a logical channel, and a set including logical channels corresponding to the ID or the priority that corresponds to the priority set including the first priority and that is of a logical channel is the first logical channel set.

With reference to the first aspect, in some implementations of the first aspect, the first uplink data channel is an uplink data channel dynamically scheduled or dynamically activated by using downlink control information (DCI); and the method further includes: determining the first priority based on at least one of the following information: a value 111 a first bit field in the DCI, a format of the DCI, a radio network temporary identifier (RNTI) corresponding to the DCI, an ID of a search space in which the DCI is located, or an ID of a control resource set in which the DCI is located.

The at least one of the foregoing information is associated with the priority of the first uplink data channel, so that the first priority can be determined based on the at least one of the foregoing information.

With reference to the first aspect, in some implementations of the first aspect, the first uplink data channel is a Type-1 configured grant uplink data channel; and the method further includes: determining the first priority based on a value of a first higher layer parameter, where the first higher layer parameter indicates a priority indication parameter of the uplink data channel; or determining the first priority based on a second higher layer parameter, where the second higher layer parameter is one or more of the following: a configuration ID, a time domain length, or a modulation and coding scheme (MCS) table of the first uplink data channel.

The one or more of the configuration ID, the time domain length, or the modulation and coding scheme MCS table of the first uplink data channel is associated with the priority of the first uplink data channel, so that the first priority can be determined based on the information.

According to a second aspect, an uplink transmission method is provided. The method may be performed by a terminal device or a module (for example, a chip) in a terminal device. An example in which the method is performed by the terminal device is used for description below.

The method includes: determining a time-frequency resource of a first uplink channel and a time-frequency resource of a second uplink channel, where the time-frequency resource of the first uplink channel and the time-frequency resource of the second uplink channel overlap in time domain, and first information of the first uplink channel is the same as first information of the second uplink channel; and sending the first uplink channel and dropping the second uplink channel when the first uplink channel and the second uplink channel satisfy a first condition.

According to a third aspect, an uplink transmission method is provided. The method may be performed by a network device or a module (for example, a chip) in a network device. An example in which the method is performed by the network device is used for description below.

The method includes: determining a time-frequency resource of a first uplink channel and a time-frequency resource of a second uplink channel, where the time-frequency resource of the first uplink channel and the time-frequency resource of the second uplink channel overlap in time domain, and first information of the first uplink channel is the same as first information of the second uplink channel; and receiving the first uplink channel and skipping receiving the second uplink channel when the first uplink channel and the second uplink channel satisfy a first condition.

Based on the foregoing technical solution, if first information of two uplink channels is the same and time-frequency resources of the two uplink channels overlap in time domain, uplink transmission can be performed based on whether the two uplink channels satisfy the first condition, thereby resolving a problem that in a scenario in which the first information of the two uplink channels is the same and the time-frequency resources of the two uplink channels overlap in time domain, a terminal device does not know how to perform uplink transmission.

Optionally, the first information of the first uplink channel may indicate a priority of the first uplink channel, or the first information of the first uplink channel may be used to determine a priority of the first uplink channel. The first information of the second uplink channel may indicate a priority of the second uplink channel, or the first information of the second uplink channel may be used to determine a priority of the second uplink channel.

With reference to the second aspect, in some implementations of the second aspect, the sending the first uplink channel and dropping the second uplink channel when the first uplink channel and the second uplink channel satisfy a first condition may be replaced by: when the first uplink channel and the second uplink channel satisfy the first condition, adjusting a transmit power of the second uplink channel, and sending the first uplink channel and the second uplink channel. A sum of a transmit power of the first uplink channel and an adjusted transmit power of the second uplink channel is less than or equal to a maximum transmit power of the terminal device.

Correspondingly, with reference to the third aspect, in some implementations of the third aspect, the receiving the first uplink channel and skipping receiving the second uplink channel when the first uplink channel and the second uplink channel satisfy a first condition may be replaced by: receiving the first uplink channel and the second uplink channel. A sum of a transmit power of the first uplink channel and an adjusted transmit power of the second uplink channel is less than or equal to a maximum transmit power of the terminal device.

Based on this technical solution, uplink transmission of two uplink channels can be implemented by adjusting a transmit power of one of the uplink channels.

With reference to the second aspect, in some implementations of the second aspect, or with reference to the third aspect, in some implementations of the third aspect, both the first uplink channel and the second uplink channel are uplink data channels; and the first condition is specifically at least one of the following:
  a priority of a logical channel corresponding to the first uplink channel is higher than a priority of a logical channel corresponding to the second uplink channel;
  an equivalent coding rate of the first uplink channel is less than an equivalent coding rate of the second uplink channel;
  a size of a transport block of the first uplink channel is greater than a size of a transport block of the second uplink channel;
  downlink control information DCI for scheduling the first uplink channel is later than DCI for scheduling the second uplink channel in time domain; or
  a grant manner of the first uplink channel is dynamic scheduling, and a grant manner of the second uplink channel is configured grant.

With reference to the second aspect, in some implementations of the second aspect, both the first uplink channel and the second uplink channel are uplink control channels; and the sending the first uplink channel and dropping the second uplink channel includes: if the first uplink channel and the second uplink channel do not satisfy a second condition, sending the first uplink channel and dropping the second uplink channel, where the second condition is a condition for multiplex transmission of two uplink control channels.

Correspondingly, with reference to the third aspect, in some implementations of the third aspect, both the first uplink channel and the second uplink channel are uplink control channels; and the receiving the first uplink channel and skipping receiving the second uplink channel includes: if the first uplink channel and the second uplink channel do not satisfy a second condition, receiving the first uplink channel and skipping receiving the second uplink channel, where the second condition is a condition for multiplex transmission of two uplink control channels.

For the condition for the multiplex transmission of two uplink control channels, specifically refer to a conventional technology.

With reference to the second aspect, in some implementations of the second aspect, or with reference to the third aspect, in some implementations of the third aspect, both the first uplink channel and the second uplink channel are uplink control channels; and the first condition is specifically at least one of the following:
  the first uplink channel and the second uplink channel are dynamically scheduled, and downlink control information DCI for scheduling the first uplink channel is later than DCI for scheduling the second uplink channel;
  the first uplink channel is dynamically scheduled, and the second uplink channel is not dynamically scheduled;
  a format of the first uplink channel is a format 0 or a format 1, and a format of the second uplink channel is a format 2, a format 3, or a format 4;
  a format of the first uplink channel is a format 0 or a format 2, and a format of the second uplink channel is the format 0, a format 3, or a format 4;
  a format of the first uplink channel is a format 2, a format 3, or a format 4, a format of the second uplink channel is the format 2, the format 3, or the format 4, and a coding rate of the first uplink channel is less than a coding rate of the second uplink channel; or
  a time domain length of the first uplink channel is less than a time domain length of the second uplink channel.

With reference to the second aspect, in some implementations of the second aspect, the first uplink channel is an uplink control channel, and the second uplink channel is an uplink data channel; or the first uplink channel is an uplink data channel, and the second uplink channel is an uplink control channel; and the sending the first uplink channel and dropping the second uplink channel includes: if the first uplink channel and the second uplink channel do not satisfy a third condition, sending the first uplink channel and dropping the second uplink channel, where the third condition is a condition for multiplex transmission of an uplink control channel and an uplink data channel.

Correspondingly, with reference to the third aspect, in some implementations of the third aspect, the first uplink channel is an uplink control channel, and the second uplink channel is an uplink data channel; or the first uplink channel is an uplink data channel, and the second uplink channel is an uplink control channel; and the receiving the first uplink channel and skipping receiving the second uplink channel includes: if the first uplink channel and the second uplink channel do not satisfy a third condition, receiving the first uplink channel and skipping receiving the second uplink channel, where the third condition is a condition for multiplex transmission of an uplink control channel and an uplink data channel.

For the condition for the multiplex transmission of an uplink control channel and an uplink data channel, specifically refer to the conventional technology.

With reference to the second aspect, in some implementations of the second aspect, or with reference to the third aspect, in some implementations of the third aspect, the first uplink channel is an uplink control channel, and the second uplink channel is an uplink data channel; or the first uplink channel is an uplink data channel, and the second uplink channel is an uplink control channel; and the first condition is specifically at least one of the following:
  the first uplink channel and the second uplink channel are dynamically scheduled, and downlink control information DCI for scheduling the first uplink channel is later than DCI for scheduling the second uplink channel; or
  the first uplink channel is dynamically scheduled, and the second uplink channel is not dynamically scheduled.

With reference to the second aspect, in some implementations of the second aspect, or with reference to the third aspect, in some implementations of the third aspect, first information of an uplink data channel is indicated by using a value in a first bit field in downlink control information DCI corresponding to the uplink data channel; or first information of an uplink data channel is indicated by using a higher layer parameter corresponding to the uplink data channel.

With reference to the second aspect, in some implementations of the second aspect, or with reference to the third aspect, in some implementations of the third aspect, if an uplink control channel is used to carry hybrid automatic repeat request (HARQ) feedback information corresponding to a downlink data channel scheduled by using downlink control information DCI, first information of the uplink control channel is at least one of the following: a value in a first bit field in the DCI, a format of the DCI, a radio network temporary identifier RNTI corresponding to the DCI, an ID of a search space in which the DCI is located, or an ID of a control resource set in which the DCI is located.

With reference to the second aspect, in some implementations of the second aspect, or with reference to the third aspect, in some implementations of the third aspect, if an uplink control channel is used to carry a scheduling request (SR), first information of the uplink control channel is at least one of the following: a first parameter in an SR configuration corresponding to the SR, an ID of the SR configuration, a transmission periodicity of the SR configuration, or a transmission length of the SR configuration.

With reference to the second aspect, in some implementations of the second aspect, or with reference to the third aspect, in some implementations of the third aspect, if an uplink control channel is used to carry channel state information (CSI), first information of the uplink control channel is at least one of the following: a second parameter in a CSI report configuration corresponding to the CSI, an ID of the CSI report configuration, or a channel quality indicator (CQI) table in the CSI report configuration.

According to a fourth aspect, an uplink transmission method is provided. The method may be performed by a terminal device or a module (for example, a chip) in a terminal device. An example in which the method is performed by the terminal device is used for description below.

The method may include: determining a transmission parameter of a second uplink control channel, where a time-frequency resource of the second uplink control channel and a time-frequency resource of a first uplink control channel overlap in time domain, the first uplink control channel is used to carry hybrid automatic repeat request HARQ feedback information, and the second uplink control channel is used to carry a scheduling request SR or channel state information CSI; and when the transmission parameter of the second uplink control channel and a priority parameter of the first uplink control channel satisfy a first condition, sending the second uplink control channel; or when the transmission parameter of the second uplink control channel and a priority parameter of the first uplink control channel do not satisfy a first condition, sending the first uplink control channel.

According to a fifth aspect, an uplink transmission method is provided. The method may be performed by a network device or a module (for example, a chip) in a network device. An example in which the method is performed by the network device is used for description below.

The method may include: determining a transmission parameter of a second uplink control channel, where a time-frequency resource of the second uplink control channel and a time-frequency resource of a first uplink control channel overlap in time domain, the first uplink control channel is used to carry hybrid automatic repeat request HARQ feedback information, and the second uplink control channel is used to carry a scheduling request SR or channel state information CSI; and when the transmission parameter of the second uplink control channel and a priority parameter of the first uplink control channel satisfy a first condition, receiving the second uplink control channel; or when the transmission parameter of the second uplink control channel and a priority parameter of the first uplink control channel do not satisfy a first condition, receiving the first uplink control channel.

According to the method provided in this application, when uplink control channels carrying two different types of uplink information overlap in time domain, a terminal device can perform uplink transmission based on whether the transmission parameter of the second uplink control channel and the priority parameter of the first uplink control channel satisfy the first condition. In this way, in the conventional technology, a problem that when the uplink control channels carrying the two different types of uplink information overlap in time domain, the terminal device does not know how to perform uplink transmission is resolved.

With reference to the fourth aspect, in some implementations of the fourth aspect, the when the transmission parameter of the second uplink control channel and a priority parameter of the first uplink control channel satisfy a first condition, sending the second uplink control channel; or when the transmission parameter of the second uplink control channel and a priority parameter of the first uplink control channel do not satisfy a first condition, sending the first uplink control channel includes: when the first uplink control channel and the second uplink control channel do not satisfy a second condition and when the transmission parameter of the second uplink control channel and the priority parameter of the first uplink control channel satisfy the first condition, sending the second uplink control channel; or when the first uplink control channel and the second uplink control channel do not satisfy a second condition and when the transmission parameter of the second uplink control channel and the priority parameter of the first uplink control channel do not satisfy the first condition, sending the first uplink control channel, where the second condition is a condition for multiplex transmission of two uplink control channels, or the second condition is that a format of the first uplink control channel is a format 1, and a format of the second uplink control channel is a format 0.

Correspondingly, with reference to the fifth aspect, in some implementations of the fifth aspect, the when the transmission parameter of the second uplink control channel and a priority parameter of the first uplink control channel satisfy a first condition, receiving the second uplink control channel; or when the transmission parameter of the second uplink control channel and a priority parameter of the first uplink control channel do not satisfy a first condition, receiving the first uplink control channel includes: when the first uplink control channel and the second uplink control channel do not satisfy a second condition and when the transmission parameter of the second uplink control channel and the priority parameter of the first uplink control channel satisfy the first condition, receiving the second uplink control channel; or when the first uplink control channel and the second uplink control channel do not satisfy a second condition and when the transmission parameter of the second uplink control channel and the priority parameter of the first uplink control channel do not satisfy the first condition, receiving the first uplink control channel, where the second condition is a condition for multiplex transmission of two uplink control channels, or the second condition is that a format of the first uplink control channel is a format 1, and a format of the second uplink control channel is a format 0.

With reference to the fourth aspect, in some implementations of the fourth aspect, or with reference to the fifth aspect, in some implementations of the fifth aspect, the second uplink control channel is used to carry the SR, and the first condition includes at least one of the following:

an identifier of an SR configuration corresponding to the SR belongs to a first set;

a transmission periodicity of the SR configuration is less than or equal to a first threshold;

a time domain length of the second uplink control channel is less than or equal to a second threshold;

a priority of a logical channel associated with the SR configuration is greater than or equal to a third threshold;

an ID of a logical channel associated with the SR configuration is less than or equal to a fourth threshold; or an ID of a logical channel associated with the SR configuration belongs to a second set.

With reference to the fourth aspect, in some implementations of the fourth aspect, or with reference to the fifth aspect, in some implementations of the fifth aspect, the second uplink control channel is used to carry the CSI, and the first condition includes at least one of the following:

a transmission periodicity of a CSI report configuration corresponding to the CSI is less than or equal to a fifth threshold;

a time domain length of the second uplink control channel is less than or equal to a sixth threshold;

an ID of the CSI report configuration belongs to a third set; or a channel quality indicator CQI table in the CSI report configuration belongs to a fourth set.

According to a sixth aspect, an uplink transmission method is provided. The method may be performed by a terminal device or a module (for example, a chip) in a terminal device. An example in which the method is performed by the terminal device is used for description below.

The method includes: receiving first downlink control information DCI and second DCI; determining a configuration ID and a priority of a first downlink data channel based on the first DCI; and determining a configuration ID and a priority of a second downlink data channel based on the second DCI. Both the first downlink data channel and the second downlink data channel are semi-persistent scheduling (SPS) PDSCHs. The first DCI includes first indication information, the first indication information is one of the configuration ID and the priority of the first downlink data channel, and the other one of the configuration ID and the priority of the first downlink data channel is determined based on the first indication information. The second DCI includes second indication information, the second indication information is one of the configuration ID and the priority of the second downlink data channel, and the other one of the configuration ID and the priority of the second downlink data channel is determined based on the second indication information.

Therefore, according to the method provided in this application, one of a priority and a configuration ID of an SPS downlink data channel is carried in DCI, so that both the priority and the configuration ID of the SPS downlink data channel can be indicated, thereby reducing signaling overheads.

With reference to the sixth aspect, in some implementations of the sixth aspect, the method further includes:

determining a transmission periodicity of the first downlink data channel based on the configuration ID of the first downlink data channel, and determining a transmission time-frequency resource of the first downlink data channel based on the transmission periodicity of the first downlink data channel and resource indication information in the first DCI;

determining a transmission periodicity of the second downlink data channel based on the configuration ID of the second downlink data channel, and determining a transmission time-frequency resource of the second downlink data channel based on the transmission periodicity of the second downlink data channel and resource indication information in the second DCI; and receiving the first downlink data channel based on the transmission time-frequency resource of the first downlink data channel, and receiving the second downlink data channel based on the transmission time-frequency resource of the second downlink data channel.

With reference to the sixth aspect, in some implementations of the sixth aspect, the method further includes:

determining a first uplink control channel resource corresponding to the first downlink data channel and a second uplink control channel resource corresponding to the second downlink data channel, where the first uplink control channel resource is used to carry HARQ feedback information of the first downlink data channel, and the second uplink control channel resource is used to carry HARQ feedback information of the second downlink data channel; and when the first uplink control channel resource and the second uplink control channel resource overlap in time domain, sending the HARQ feedback information of the first downlink data channel and the HARQ feedback information of the second downlink data channel on a third uplink control channel resource; or when the first uplink control channel resource and the second uplink control channel resource overlap in time domain, sending the HARQ feedback information of the first downlink data channel by using the first uplink control channel resource, and stopping sending, by using the second uplink control channel resource, the HARQ feedback information of the second downlink data channel, where a priority of the first downlink data channel is higher than a priority of the second downlink data channel.

The third uplink control channel resource may be one of the first uplink control channel resource and the second uplink control channel resource, or may be an uplink control channel resource different from the first uplink control channel resource and the second uplink control channel resource.

Based on this solution, the terminal device may determine a priority of a downlink data channel, and feed back, based on the priority of the downlink data channel, HARQ feedback information that is for the downlink data channel.

According to a seventh aspect, an uplink transmission method is provided. The method may be performed by a network device or a module (for example, a chip) in a network device. An example in which the method is performed by the network device is used for description below.

The method includes: generating first downlink control information DCI and second DCI; and sending the first DCI and the second DCI. The first DCI includes first indication information, the first indication information is one of a configuration ID and a priority of a first downlink data channel, and the other one of the configuration ID and the priority of the first downlink data channel is determined based on the first indication information. The second DCI includes second indication information, the second indication information is one of a configuration ID and a priority of a second downlink data channel, and the other one of the configuration ID and the priority of the second downlink data channel is determined based on the second indication information. Both the first downlink data channel and the second downlink data channel are SPS PDSCHs.

Therefore, according to the method provided in this application, one of a priority and a configuration ID of an SPS downlink data channel is carried in DCI, so that both the priority and the configuration ID of the SPS downlink data channel can be indicated, thereby reducing signaling overheads.

With reference to the seventh aspect, in some implementations of the seventh aspect, the method further includes: sending the first downlink data channel based on a transmission time-frequency resource of the first downlink data channel, and sending the second downlink data channel based on a transmission time-frequency resource of the second downlink data channel.

With reference to the seventh aspect, in some implementations of the seventh aspect, the method further includes:
  determining a first uplink control channel resource corresponding to the first downlink data channel and a second uplink control channel resource corresponding to the second downlink data channel, where the first uplink control channel resource is used to carry hybrid automatic repeat request HARQ feedback information of the first downlink data channel, and the second uplink control channel resource is used to carry HARQ feedback information of the second downlink data channel; and
  when the first uplink control channel resource and the second uplink control channel resource overlap in time domain, receiving the HARQ feedback information of the first downlink data channel and the HARQ feedback information of the second downlink data channel on a third uplink control channel resource; or
  when the first uplink control channel resource and the second uplink control channel resource overlap in time domain, receiving the HARQ feedback information of the first downlink data channel on the first uplink control channel resource, where a priority of the first downlink data channel is higher than a priority of the second downlink data channel.

According to an eighth aspect, a communication apparatus is provided. The communication apparatus includes modules or units configured to perform the method according to any one of the first aspect, the second aspect, the fourth aspect, the sixth aspect and the possible implementations of the first aspect, the second aspect, the fourth aspect, or the sixth aspect.

According to a ninth aspect, a communication apparatus is provided, and includes a processor. The processor is coupled to a memory, and may be configured to execute instructions in the memory, to implement the method according to any one of the first aspect, the second aspect, the fourth aspect, the sixth aspect and the possible implementations of the first aspect, the second aspect, the fourth aspect, or the sixth aspect.

Optionally, the communication apparatus further includes the memory. Optionally, the communication apparatus further includes an interface circuit, and the processor is coupled to the interface circuit.

In an implementation, the communication apparatus is a terminal device. When the communication apparatus is the terminal device, the interface circuit may be a transceiver or an input/output interface.

In another implementation, the communication apparatus is a chip disposed in a terminal device. When the communication apparatus is the chip disposed in the terminal device, the interface circuit may be an input/output interface.

Optionally, the transceiver may be a transceiver circuit. Optionally, the input/output interface may be an input/output circuit.

According to a tenth aspect, a communication apparatus is provided. The communication apparatus includes modules or units configured to perform the method according to any one of the third aspect, the fifth aspect, the seventh aspect and the possible implementations of the third aspect, the fifth aspect, or the seventh aspect.

According to an eleventh aspect, a communication apparatus is provided, and includes a processor. The processor is coupled to a memory, and may be configured to execute instructions in the memory, to implement the method according to any one of the third aspect, the fifth aspect, the seventh aspect and the possible implementations of the third aspect, the fifth aspect, or the seventh aspect.

Optionally, the communication apparatus further includes the memory. Optionally, the communication apparatus further includes an interface circuit, and the processor is coupled to the interface circuit.

In an implementation, the communication apparatus is a network device. When the communication apparatus is the network device, the interface circuit may be a transceiver or an input/output interface.

In another implementation, the communication apparatus is a chip disposed in a network device. When the communication apparatus is the chip disposed in the network device, the interface circuit may be an input/output interface.

Optionally, the transceiver may be a transceiver circuit. Optionally, the input/output interface may be an input/output circuit.

According to a twelfth aspect, a processor is provided, and includes an input circuit, an output circuit, and a processing circuit. The processing circuit is configured to receive a signal by using the input circuit, and transmit a signal by using the output circuit, to enable the processor to perform the method according to any one of the first aspect to the seventh aspect and the possible implementations of the first aspect to the seventh aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in this embodiment of this application.

According to a thirteenth aspect, a processing apparatus is provided, and includes a processor and a memory. The processor is configured to read instructions stored in the memory, and may receive a signal by using a receiver, and transmit a signal by using a transmitter, to perform the method according to any one of the first aspect to the seventh aspect and the possible implementations of the first aspect to the seventh aspect.

Optionally, there are one or more processors, and there are one or more memories.

Optionally, the memory may be integrated into the processor, or the memory and the processor are separately disposed.

In a specific implementation procedure, the memory may be a non-transitory (non-transitory) memory, such as a read-only memory (ROM). The memory and the processor may be integrated into one chip, or may be disposed in different chips. A type of the memory and a manner in which the memory and the processor are disposed are not limited in this embodiment of this application.

It should be understood that a related data exchange procedure, for example, sending uplink control information, may be a procedure of outputting the uplink control information from the processor, and receiving the information may be a procedure of receiving the information by the processor. Specifically, data output by the processor may be output to a transmitter, and input data received by the processor may be from a receiver. The transmitter and the receiver may be collectively referred to as a transceiver.

The processing apparatus in the thirteenth aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may exist independently outside the processor.

According to a fourteenth aspect, a computer program product is provided. The computer program product includes a computer program (which is also referred to as code or instructions). When the computer program is run, a computer is enabled to perform the method according to any one of the first aspect to the seventh aspect and the possible implementations of the first aspect to the seventh aspect.

According to a fifteenth aspect, a computer-readable medium is provided. The computer-readable medium stores a computer program (which is also referred to as code or instructions). When the computer program is run on a computer, the computer is enabled to perform the method according to any one of the first aspect to the seventh aspect and the possible implementations of the first aspect to the seventh aspect.

According to a sixteenth aspect, a communication system is provided. The communication system includes the foregoing network device and terminal device

DETAILED DESCRIPTION OF ILLUSTRATIVE EMBODIMENTS

Figure 1:
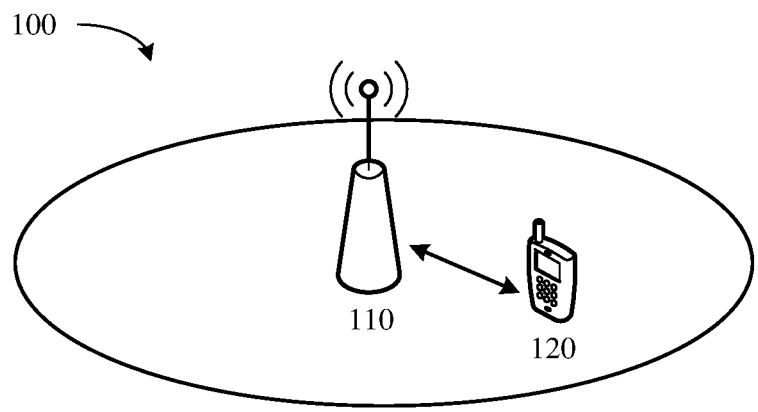
FIG. 1 is a schematic architectural diagram of a mobile communication system applied to embodiments of this application.

The following describes technical solutions of this application with reference to the accompanying drawings.

The technical solutions in embodiments of this application may be applied to various communication systems, for example, a long term evolution (LTE) system, a new radio (NR) system in a 5th generation (5G) mobile communication system, and a future mobile communication system.

A terminal device in the embodiments of this application may be referred to as a terminal, user equipment (UE), a mobile station (MS), a mobile terminal (MT), or the like. The terminal device may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. A specific technology and a specific device form used by the terminal device are not limited in the embodiments of this application.

A network device in the embodiments of this application is an access device used by the terminal device to access the mobile communication system in a wireless manner, and may be a NodeB, an evolved NodeB (eNB), a transmission reception point (TRP), a next generation NodeB (gNB) in the 5G mobile communication system, a base station in a future mobile communication system, an access node in a Wi-Fi system, or the like. A specific technology and a specific device form used by the network device are not limited in the embodiments of this application.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a function module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but are not limited to a radio channel and various other media that can store, include, and/or carry instructions and/or data.

FIG. 1 is a schematic architectural diagram of a mobile communication system 100 applied to this application. As shown in FIG. 1, the communication system 100 may include at least one network device, for example, a network device 100 shown in FIG. 1. The communication system 100 may further include at least one terminal device, for example, a terminal device 120 shown in FIG. 1. The network device 100 may communicate with the terminal device 120 through a radio link. The terminal device 120 may be at a fixed position or may be movable. It should be understood that FIG. 1 is only a schematic diagram. The communication system may further include another network device, for example, may further include a core network device, a wireless relay device, and a wireless backhaul device. Quantities of network devices and terminal devices included in the mobile communication system are not limited in the embodiments of this application.

In this application, an example in which a PUSCH is used as an uplink data channel, a physical downlink shared channel (PDSCH) is used as a downlink data channel, a PUCCH is used as an uplink control channel, and a physical downlink control channel (PDCCH) is used as a downlink control channel is used for description. However, specific names of the uplink data channel, the downlink data channel, the uplink control channel, and the downlink control channel are not limited in this application, and the names may be different in different systems.

The following first describes some terms or concepts involved in this application.

1. Dynamic Grant PUSCH and Configured Grant PUSCH

At a physical layer, a terminal device transmits uplink data by using a PUSCH. There are two types of PUSCHs in NR, namely, a dynamic grant PUSCH and a configured grant PUSCH. The configured grant PUSCH is further classified into two types, namely, a Type-1 configured grant PUSCH and a Type-2 configured grant PUSCH.

Dynamic grant PUSCH: The dynamic grant PUSCH means that when sending the PUSCH, the terminal device needs to comply with dynamic and real-time scheduling of a network device. Specifically, the network device sends an uplink (UL) grant to the terminal device by using downlink control information (DCI), to allocate a resource for transmitting the PUSCH and indicate a transmission mode of the PUSCH. The terminal device sends the PUSCH on the allocated resource by using the indicated transmission mode. An important concept associated with the dynamic grant PUSCH is a scheduling request (SR). When the terminal device has no available resource to transmit the PUSCH, the terminal device sends the SR to the network device, to notify the network device that the terminal device has data to transmit, thereby triggering the network device to send the UL grant.

Type-1 configured grant PUSCH: The configured grant means that when sending the PUSCH, the terminal device does not rely on dynamic and real-time scheduling of the network device. Provided that the terminal device and the network device reach an agreement, the terminal device may send the PUSCH at an agreed position in an agreed manner. Herein, "Type-1" means grant-free (GF) transmission. Specifically, the network device directly configures a PUSCH transmission occasion, namely, a GF PUSCH occasion, for the terminal device by using a radio resource control (RRC) layer parameter. The transmission occasion includes a time-frequency resource position, an occurrence periodicity, a repetition quantity, and a specific data transmission solution (for example, a modulation and coding scheme, space-domain precoding, and a quantity of layers). On each GF PUSCH occasion, if data arrives at the terminal device, correspondingly, the data arrives at one logical channel (or a plurality of logical channels) at a MAC layer; and if a parameter configuredGrantType1Allowed of the logical channel indicates that transmission can be performed on the Type-1 configured grant PUSCH, the terminal device performs MAC PDU packet assembly, and sends the corresponding data on the GF PUSCH occasion. If no data arrives at the terminal device, or data arriving at the terminal device cannot be carried on the Type-1 configured grant PUSCH, data is not sent on this GF PUSCH occasion.

Type-2 configured grant PUSCH: A difference from the Type-1 configured grant PUSCH is that the Type-2 configured grant PUSCH needs to be activated based on a UL grant, and the UL grant may indicate a part of parameters of PUSCH transmission, for example, a time domain position, a frequency domain resource, and a modulation and coding scheme of the first PUSCH transmission. Some other parameters, such as a periodicity and a repetition quantity, may be indicated by an RRC layer parameter. The terminal device sends the PUSCH on a corresponding time-frequency resource at an interval of one periodicity based on the UL grant by using a same transmission solution. If no data arrives at the terminal device, or data arriving at the terminal device cannot be carried on the Type-2 configured grant PUSCH, data is not sent on this GF PUSCH occasion.

2. Scheduling Request SR

When data arrives at a terminal device, if the terminal device has an available resource for transmitting a PUSCH at this time, the terminal device may send the data on the resource by using the PUSCH. When the terminal device has no available resource for transmitting the PUSCH, the terminal device needs to send a scheduling request (SR) on a predefined PUCCH resource. After receiving the SR, a network device learns that data arrives at the terminal device, and sends a UL grant to the terminal device, to schedule a PUSCH for the terminal device, allocate a resource, and indicate a transmission mode. In this way, the terminal device may send the data by using the PUSCH. The PUCCH resource that carries the SR is configured by a higher layer, and may be a short PUCCH or a long PUCCH.

In R15, to help the network device identify a service, where arrival of data of the service triggers the SR, a plurality of SR configurations are configured. Each SR configuration is associated with one or more logical channels, and the configurations are carried on different PUCCHs. In this way, after receiving the SR, the network device may determine, based on a PUCCH resource that carries the SR, a logical channel on which the data arrives, to schedule a proper PUSCH for carrying the data. On a terminal device side, if a plurality of SR configurations are triggered and PUCCH resources carrying the SR configurations overlap, the terminal device may choose to silence one or more SR configurations, and send only one SR configuration.

3. Channel State Information (CSI)

When scheduling downlink data transmission, a network device needs to select a proper modulation and coding scheme (MCS), a proper space-domain processing policy (for example, a precoding matrix or a quantity of transmission layers), and a proper time-frequency resource. Therefore, a terminal device needs to measure a downlink radio channel that is from the network device to the terminal device, to obtain CSI, and report the CSI to the network device, so that the network device adjusts a transmission policy. Currently, in R15, CSI carried on a PUCCH includes two types: periodic CSI and semi-persistent CSI, namely, P-CSI and SP-CSI. Subsequently, the PUCCH may carry aperiodic CSI. The CSI may include a plurality of types of information, for example, a transmission channel rank indication (RI), a precoding matrix indication (PMI), and a channel quality indicator (CQI). For the P-CSI and the SP-CSI, PUCCH resources carrying the CSI are configured by a higher layer. For the A-CSI, a PUCCH resource carrying the CSI may be configured by the higher layer, or may be dynamically indicated by DCI. Generally, when a plurality of CSI reports are sent on a plurality of PUCCH resources, if the PUCCH resources overlap, the higher layer may configure whether a joint feedback of the plurality of CSI reports is supported. If the joint feedback of the plurality of CSI reports is supported, the plurality of CSI reports in one slot may be combined on a new PUCCH resource for the joint feedback. If the joint feedback of the plurality of CSI reports is not supported, the terminal device generally drops a CSI report whose priority is lower, and sends only a CSI report whose priority is higher.

4. HARQ-ACK

The HARQ-ACK is also sometimes referred to as hybrid automatic repeat request (HARQ) feedback information. Currently, NR downlink transmission supports an explicit HARQ-ACK feedback. After receiving a PDSCH, a terminal device feeds back a receiving status of the PDSCH on a specific PUCCH resource, that is, feeds back an acknowledgment (ACK) when decoding is correct, or feeds back a negative acknowledgment (NACK) when decoding is wrong. Because a multicarrier system and a time division duplex (TDD) frame structure need to be supported, to reduce PUCCH resource overheads and avoid a separate feedback of a HARQ-ACK of each PDSCH, both LTE and NR support HARQ-ACK multiplexing. That is, a plurality of HARQ-ACKs may correspond to one PUCCH resource, and one HARQ-ACK codebook including the plurality of HARQ-ACKs is fed back on the PUCCH resource. For the HARQ-ACK of each PDSCH, DCI for scheduling the PDSCH indicates a slot in which and a PUCCH resource on which the corresponding HARQ-ACK is to be fed back, to help perform HARQ-ACK multiplexing. Generally, the slot in which the HARQ-ACK is to be fed back is indicated by the DCI, and the PUCCH resource carrying the HARQ-ACK may be indicated by the DCI, or may be configured by a higher layer. A case in which the PUCCH resource carrying the HARQ-ACK is indicated by the DCI is mainly for a HARQ-ACK of a dynamically scheduled PDSCH, and a case in which the PUCCH resource carrying the HARQ-ACK is configured by the higher layer is mainly for a HARQ-ACK of a semi-persistent scheduling PDSCH.

In NR, HARQ-ACK codebooks are classified into a dynamic codebook and a semi-static codebook. However, regardless of the codebooks, in R15, only per-slot HARQ-ACK multiplexing is currently supported, that is, all HARQ-ACKs corresponding to one slot are multiplexed, and a codebook including the HARQ-ACKs is fed back on a PUCCH resource.

5. Uplink Multiplexing

In uplink transmission, NR does not support simultaneous transmission of a plurality of physical uplink control channels (PUCCHs) and simultaneous transmission of a PUCCH and a PUSCH. When a plurality of PUCCHs overlap in time domain or a PUCCH and a PUSCH overlap in time domain, uplink multiplexing, alternatively referred to as UCI MUX, needs to be performed. Similarly, NR does not support a terminal device in simultaneously transmitting, on one carrier, a plurality of PUSCHs that overlap in time domain. When the plurality of PUSCHs overlap in time domain, one PUSCH needs to be dropped. The processing performed when the plurality of PUSCHs overlap in time domain is generally referred to as the uplink multiplexing. In this application, unless otherwise specified, overlapping refers to overlapping in time domain.

In R15, when a PUCCH overlaps a PUCCH/PUSCH, whether a timeline is satisfied needs to be determined. The terminal device performs UCI MUX only when the timeline is satisfied. In R15, a definition of the timeline of the UCI MUX includes:

A1: When a PUCCH in PUCCHs that overlap carries a HARQ-ACK, a distance between an earliest start symbol of all PUCCHs/PUSCHs that overlap and an end symbol of a PDSCH corresponding to the HARQ-ACK needs to be greater than or equal to a first threshold.

A2: When a PUSCH that overlaps carries data, a distance between an earliest start symbol of all PUCCHs/PUSCHs that overlap and an end symbol of DCI for scheduling the PUSCH needs to be greater than or equal to a second threshold.

A3: When a PUSCH that overlaps carries aperiodic CSI, a distance between an earliest start symbol of all PUCCHs/PUSCHs that overlap and an end symbol of DCI for scheduling the PUSCH needs to be greater than or equal to a third threshold.

Specifically, the first threshold, the second threshold, and the third threshold are related to a subcarrier spacing and/or a terminal device capability.

In R15, for one terminal device, if a plurality of PUSCHs overlap, a processing method is as follows:

if both the PUSCHs that overlap are dynamic grant PUSCHs, it is considered that a case in which all the PUSCHs that overlap are dynamic grant PUSCHs should not occur, and correspondingly, behavior of the terminal device is not specified;

if one of the PUSCHs that overlap is a dynamic grant PUSCH, and the other one is a configured grant PUSCH, the configured grant PUSCH is dropped, and the dynamic grant PUSCH is sent; or if both the PUSCHs that overlap are configured grant PUSCHs, a case in which all the PUSCHs that overlap are configured grant PUSCHs does not exist, and a network device should avoid this case when performing configuration or scheduling.

Currently, to enhance uplink multiplexing of URLLC, the concept of a priority of an uplink channel is proposed. After the concept of the priority of the uplink channel is introduced, for PUSCHs with different priorities, how to ensure that data, having different quality of service (QoS) requirements, of logical channels can be carried and sent on physical channels with proper priorities is a problem that needs to be resolved.

In view of this, this application provides an uplink transmission method. Based on the method, a corresponding logical channel may be determined based on a priority of a PUSCH, and a MAC PDU may further be generated based on the determined logical channel and sent, thereby resolving a problem of mapping data of a logical channel to a PUSCH after a priority of the PUSCH is introduced. The following describes the uplink transmission method provided in this application.

In the following description of the method, some operations are mainly described by using an example in which a terminal device is an execution body, and some other operations are mainly described by using an example in which a network device is an execution body. However, this does not constitute any limitation on this application. Actually, the operations performed by the terminal device may alternatively be performed by a module (for example, a chip) in the terminal device. Similarly, the operations performed by the network device may alternatively be performed by a module (for example, a chip) in the network device.

Figure 2:
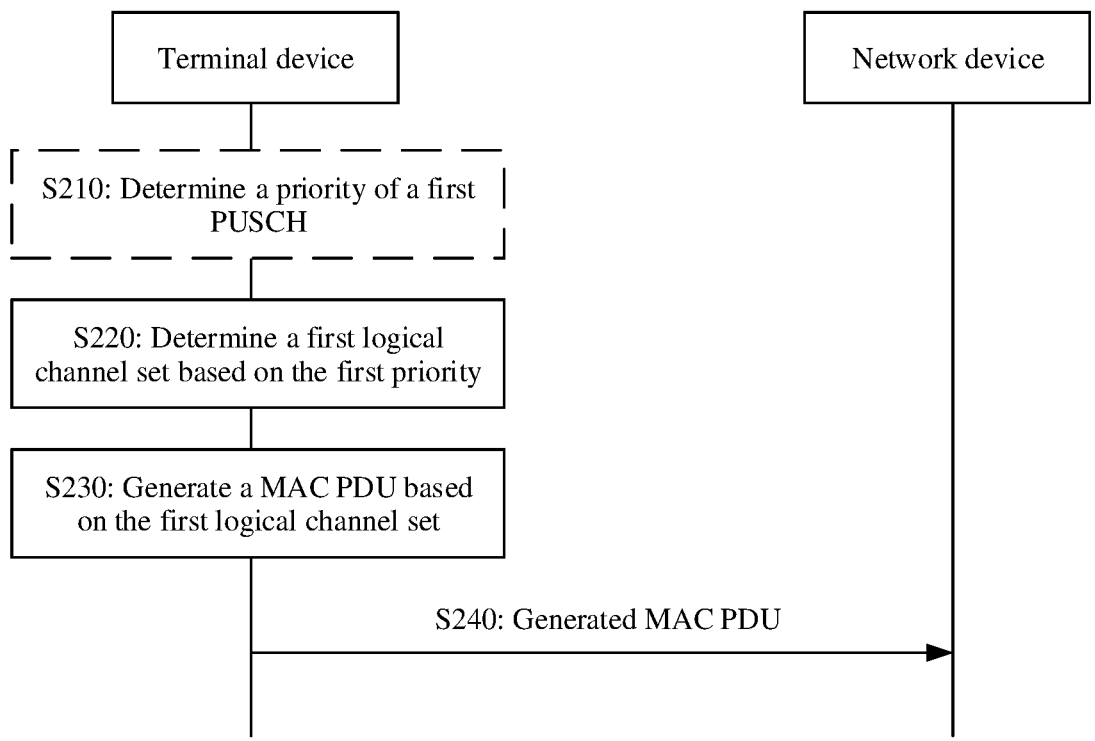
FIG. 2 is a schematic flowchart of an uplink transmission method according to an embodiment of this application.

FIG. 2 is a schematic flowchart of an uplink transmission method 200 according to this application. The method 200 mainly includes S220 to S240. Optionally, the method 200 may further include S210. The following describes the steps.

S210: A terminal device determines a priority of a first PUSCH. For ease of description, the priority of the first PUSCH is denoted as a first priority.

It should be understood that the priority may be represented by using a value (or referred to as a numerical value), and a priority of a PUSCH may be a value of the priority of the PUSCH. For brevity, when the method 200 is described in this specification, the concept of "a value of a priority" is replaced with "priority".

S220: The terminal device determines a logical channel set corresponding to the first PUSCH based on the first priority.

For ease of description, the logical channel set corresponding to the first PUSCH is denoted as a first logical channel set. The first logical channel set includes one or more logical channels.

S230: The terminal device generates a MAC PDU based on the first logical channel set.

S240: The terminal device sends the MAC PDU on the first PUSCH. Correspondingly, a network device receives the MAC PDU.

According to the uplink transmission method provided in this application, a priority of a PUSCH is associated with a logical channel, the corresponding logical channel is determined based on the priority of the PUSCH, and a MAC PDU may further be generated based on the determined logical channel and sent. This resolves a problem of mapping data of the logical channel to the PUSCH after the priority of the PUSCH is introduced.

The following describes a possible implementation of S210 with reference to a type of the first PUSCH. It should be noted that, in this application, when the priority is described, it is assumed that a smaller value indicates a higher priority (which is alternatively referred to as a larger priority), and a larger value indicates a lower priority (which is alternatively referred to as a smaller priority). For example, a priority 1 (namely, a priority represent by "1") is higher than a priority 2 (namely, a priority represented by "2").

1. The first PUSCH is a dynamic grant PUSCH, that is, the first PUSCH is dynamically scheduled by using DCI. For ease of description, the DCI used to dynamically schedule the first PUSCH is denoted as DCI #1.

In this case, the terminal device may determine the first priority based on at least one of the following information: a value 111 a first bit field in the DCI #1, a format of the DCI #1, an RNTI corresponding to the DCI #1, an identifier (ID) of a search space in which the DCI #1 is located, or an ID of a control resource set in which the DCI #1 is located. The first bit field may include one or more bits.

For example, if the first bit field in the DCI #1 includes one bit, a value 0 and a value 1 of the bit may respectively represent that the first priority is 1 and 2 or that the first priority is 0 and 1. For another example, if the first bit field in the DCI #1 includes three bits, a value 000 to a value 111 respectively represent that the first priority is 1 to 8 or 0 to 7. For another example, if the RNTI corresponding to the DCI #1 is a first RNTI, it indicates that the first priority is 1; and if the RNTI corresponding to the DCI #1 is a second RNTI, it indicates that the first priority is 2. The first RNTI may be, for example, a modulation and coding scheme-cell radio network temporary identifier (MCS-C-RNTI), a configured scheduling radio network temporary identifier (CS-RNTI), or a new RNTI. A type of the second RNTI is different from that of the first RNTI. The second RNTI may be, for example, a cell radio network temporary identifier (C-RNTI).

It should be understood that, in this application, the RNTI corresponding to the DCI #1 is an RNTI used to scramble a cyclic redundancy check (CRC) bit sequence of the DCI #1.

2. The first PUSCH is a Type-1 configured grant PUSCH.

In this case, the terminal device may determine the first priority based on a value of a first higher layer parameter or based on a second higher layer parameter. That is, the first priority is indicated by the value of the first higher layer parameter or by the second higher layer parameter.

In this application, a higher layer may be an RRC layer or a MAC layer. Correspondingly, a higher layer parameter may be a parameter carried in signaling of the RRC layer or a parameter carried in signaling of the MAC layer.

The first higher layer parameter may explicitly indicate the priority of the PUSCH. For a correspondence between the first higher layer parameter and the priority of the PUSCH, refer to the correspondence between the value of the first bit field and the priority of the PUSCH.

The second higher layer parameter may implicitly indicate the first priority. For example, the second higher layer parameter may be one or more of the following information: a configuration identifier of the first PUSCH, an MCS table, a transmission periodicity of the first PUSCH, or a time domain length of the first PUSCH. The transmission periodicity of the first PUSCH is the "occurrence periodicity" described in the foregoing description of the Type-1 configured grant PUSCH, namely, a periodicity of a GF PUSCH occasion. The time domain length of the first PUSCH indicates a length of a time domain resource occupied by the first PUSCH, and a unit of the time domain length may be an OFDM symbol. However, this is not limited in this application.

For example, the second higher layer parameter may be the configuration identifier of the first PUSCH, different configuration identifiers correspond to different transmission parameters, and there is a correspondence between the configuration identifier and the value of the first priority. If the configuration identifier belongs to a first set, the first priority is 1; and if the configuration identifier belongs to a second set, the first priority is 2. For another example, the second higher layer parameter may be the MCS table of the first PUSCH. When the MCS table is a low-spectral-efficiency table (that is, spectral efficiency corresponding to a lowest MCS index in the table is the lowest in all tables), the first priority is 1; and when the MCS table is not the low-spectral-efficiency table, the first priority is 2. For another example, when the transmission periodicity of the first PUSCH is less than or equal to a first threshold, the first priority is 1; and when the transmission periodicity of the first PUSCH is greater than the first threshold, the first priority is 2. The first threshold is a parameter that is predefined or that is configured by a higher layer. For another example, when the time domain length of the first PUSCH is less than or equal to a second threshold, the first priority is 1; and when the time domain length of the first PUSCH is greater than the second threshold, the first priority is 2. The second threshold is a parameter that is predefined or that is configured by a higher layer.

3. The first PUSCH is a Type-2 configured grant PUSCH, that is, the first PUSCH is a semi-persistent scheduling PUSCH, or the first PUSCH is referred to as a PUSCH activated by using DCI.

In this case, a manner of determining the first priority may be the manner of determining the first priority when the first PUSCH is the dynamic grant PUSCH, where the DCI in this case is the DCI for activating the first PUSCH.

Further, when the first PUSCH is the Type-2 configured grant PUSCH and the first PUSCH is transmitted for the first time, the manner of determining the first priority may be the manner of determining the first priority when the first PUSCH is the dynamic grant PUSCH, where the DCI in this case is the DCI for activating the first PUSCH.

In addition, the manner of determining the first priority may alternatively be the same as the manner of determining the first priority when the first PUSCH is the Type-1 configured grant PUSCH.

Further, when the first PUSCH is the Type-2 configured grant PUSCH and the first PUSCH is not transmitted for the first time, the manner of determining the first priority may also be the same as the manner of determining the first priority when the first PUSCH is the Type-1 configured grant PUSCH.

The following describes a possible implementation of S220.

Manner 1

The terminal device may determine the first logical channel set based on the first priority and a mapping relationship between a priority of a PUSCH and a logical channel set. The mapping relationship between a priority of a PUSCH and a logical channel set may be defined in a protocol, or may be configured by the network device for the terminal device by using signaling. The signaling herein may be RRC signaling or DCI.

For example, the mapping relationship between a priority of a PUSCH and a logical channel set may be shown in Table 1. It should be noted that the first column in Table 1 uses a specific value to indicate the priority of the PUSCH. In an actual application, the value of the first column may alternatively be replaced with other information that can indicate the priority of the PUSCH, for example, a format of DCI for scheduling or activating the PUSCH, an RNTI corresponding to the DCI for scheduling or activating the PUSCH, an ID of a search space in which the DCI for scheduling or activating the PUSCH is located, and/or an MCS table of the PUSCH. An element in a logical channel set in the second column shown in Table 1 is an ID of the logical channel. In an actual application, the element in the logical channel set may alternatively be a priority of the logical channel, and the corresponding logical channel may be determined based on the priority of the logical channel.

TABLE 1

| Priority of the PUSCH | Logical channel set |
|---|---|
| 1 | {1, 2, 3} |
| 2 | {4, 5} |
| 3 | {6, 7, 8} |
| ... | ... |

Refer to Table 1. If the priority of the first PUSCH is 1, it can be determined that the first logical channel set is {1, 2, 3}. If the priority of the first PUSCH is 2, it can be determined that the first logical channel set is {4, 5}. Another case is similar.

Optionally, for any two different priorities of the PUSCH, there is not intersection between corresponding logical channel sets.

Specifically, the mapping relationship between a priority of a PUSCH and a logical channel set may include a first mapping sub-relationship and a second mapping sub-relationship, and the first mapping sub-relationship and the second mapping sub-relationship are any two of mapping sub-relationships included in the mapping relationship between a priority of a PUSCH and a logical channel set. The first mapping sub-relationship is a mapping relationship between a second priority and a second logical channel set, the second mapping sub-relationship is a mapping relationship between a third priority and a third logical channel set, the second priority and the third priority are any two different values of the priority of the PUSCH, and there is no intersection between the second logical channel set and the third logical channel set.

An example is used for description with reference to Table 1. The first mapping sub-relationship may be a mapping relationship between the priority 1 of the PUSCH and the second logical channel set {1, 2, 3}, and the second mapping sub-relationship may be a mapping relationship between the priority 2 of the PUSCH and the third logical channel set {4, 5}. In Table 1, there is no intersection between the second logical channel set {1, 2, 3} and the third logical channel set {4, 5}.

Based on this solution, there is no intersection between logical channel sets associated with different priorities of an uplink data channel, so that it can be ensured that data on different logical channels is carried on physical uplink data channels with different priorities, thereby implementing separate transmission between data of different service flows and different quality of service (QoS) requirements, and helping ensure stability and reliability of service transmission.

In addition, for any two different priorities of the PUSCH, there may alternatively be an intersection between corresponding logical channel sets. This is not limited in this application.

Further, the second priority is higher than the third priority, and a priority of any logical channel in the second logical channel set is higher than a priority of a logical channel with a highest priority in the third logical channel set.

In other words, a PUSCH with a higher priority may be associated with a logical channel with a higher priority, thereby helping provide differentiated assurance on a delay and reliability.

Optionally, an ID of the logical channel in the first logical channel set is greater than or equal to a first threshold, or the ID of the logical channel in the first logical channel set is less than or equal to the first threshold. Alternatively, a priority of the logical channel in the first logical channel set is greater than or equal to the first threshold, or the priority of the logical channel in the first logical channel set is less than or equal to the first threshold. The first threshold corresponds to the first priority.

The first threshold may be predefined in a protocol, or may be configured by the network device for the terminal device by using higher layer signaling. The terminal device may determine the first logical channel set based on the first threshold. For example, the ID of the logical channel in the first logical channel set is less than or equal to the first threshold. In this case, when the first threshold is 3, the first logical channel set is {1, 2, 3}; and when the first threshold is 5, the first logical channel set is {1, 2, 3, 4, 5}.

Based on this solution, the first threshold may be determined based on the first priority, and the first logical channel set may further be determined based on the first threshold. Therefore, the network device needs to configure, for the terminal device, only the first threshold corresponding to the first priority. Compared with a solution in which the first logical channel set is directly configured for the terminal device, signaling overheads can be reduced.

Manner 2

The terminal device determines the first logical channel set based on the first priority and a mapping relationship between an ID of a logical channel and a priority set of a PUSCH or based on the first priority and a mapping relationship between a priority of a logical channel and a priority set of a PUSCH. Data on any logical channel can be transmitted on a PUSCH whose priority belongs to a priority set corresponding to the logical channel. The priority set of the PUSCH may include one or more priorities of the PUSCH.

The mapping relationship between an ID of a logical channel and a priority set of a PUSCH and the mapping relationship between a priority of a logical channel and a priority set of a PUSCH may be predefined in a protocol, or may be configured by the network device for the terminal device by using signaling. The terminal device may determine an ID or a priority that corresponds to a priority set including the first priority and that is of a logical channel, and a set including the logical channel corresponding to the ID or the priority that corresponds to the priority set including the first priority is the first logical channel set.

For example, the mapping relationship between an ID of to logical channel and a priority set of a PUSCH may be shown in Table 2.

TABLE 2

| ID of the logical channel | Priority set of the PUSCH |
|---|---|
| 1 | {1, 2} |
| 2 | {1, 2} |
| 3 | {3, 4} |
| ... | ... |

Refer to Table 2. If the priority of the first PUSCH is 1, it can be determined that IDs, of logical channels, corresponding to a priority set including the priority 1 of the PUSCH are 1 and 2, so that it can be determined that the first logical channel set is {1, 2}.

For another example, the mapping relationship between a priority of a logical channel and a priority set of a PUSCH may be shown in Table 3.

TABLE 3

| Priority of the logical channel | Priority set of the PUSCH |
|---|---|
| 1 | {1, 2} |
| 2 | {1, 2} |
| 3 | {1, 2} |
| 4 | {3, 4} |
| ... | ... |

Refer to Table 3. If the priority of the first PUSCH is 1, it can be determined that priorities, of logical channels, corresponding to a priority set including the priority 1 of the PUSCH are 1, 2, and 3, so that it can be determined that the first logical channel set includes the logical channels whose priorities are 1, 2, and 3.

Based on the technical solution in the manner 2, the terminal device can determine, within specific duration by using the mapping relationship between an ID of a logical channel and a priority set of a PUSCH or the mapping relationship between a priority of a logical channel and a priority set of a PUSCH, a logical channel set corresponding to any uplink data channel. Therefore, the network device does not need to indicate a corresponding logical channel set for each uplink data channel by using signaling, thereby reducing signaling overheads and implementation complexity.

Further, an element in a priority set, corresponding to an identifier of a second logical channel, of a PUSCH is greater than or equal to a second threshold, or the element in the priority set, corresponding to the identifier of the second logical channel, of a PUSCH is less than or equal to the second threshold. The second threshold corresponds to the second logical channel, and the second logical channel is any logical channel in the first logical channel set.

For example, for any logical channel, a second threshold corresponding to the logical channel may be predefined, or the second threshold is configured by the network device for the terminal device by using higher layer signaling. The terminal device may determine a priority set, corresponding to the logical channel, of the PUSCH based on the second threshold.

For example, when a threshold corresponding to a logical channel 1 and a threshold corresponding to a logical channel 2 are respectively 1 and 2, it indicates that an element in a priority set, corresponding to the logical channel 1, of a PUSCH is greater than or equal to 1, and an element in a priority set, corresponding to the logical channel 2, of a PUSCH is greater than or equal to 2. In other words, a priority, corresponding to the logical channel 1, of the PUSCH is less than or equal to the priority 1, and a priority, corresponding to the logical channel 2, of the PUSCH is less than or equal to the priority 2. That is, data on the logical channel 1 can be transmitted only on a PUSCH whose priority is less than or equal to 1, and data on the logical channel 2 can be transmitted only on a PUSCH whose priority is less than or equal to 2. Generally, a smaller ID of a logical channel indicates a higher priority of the logical channel. Therefore, based on the foregoing technical solution, it can be ensured that data of a logical channel with a lower priority (which represents the logical channel 2 herein) does not preempt a resource of a PUSCH with a higher priority (namely, the PUSCH whose priority is less than or equal to 1), and a phenomenon in which data transmission of the logical channel with the higher priority is blocked does not occur.

For another example, when a threshold corresponding to a logical channel 1 and a threshold corresponding to a logical channel 2 are respectively 1 and 2, it indicates that an element in a priority set, corresponding to the logical channel 1, of a PUSCH is less than or equal to 1, and an element in a priority set, corresponding to the logical channel 2, of a PUSCH is less than or equal to 2. In other words, a priority, corresponding to the logical channel 1, of the PUSCH is greater than or equal to the priority 1, and a priority, corresponding to the logical channel 2, of the PUSCH is greater than or equal to the priority 2. That is, data on the logical channel 1 can be transmitted only on a PUSCH whose priority is greater than or equal to 1, and data on the logical channel 2 can be transmitted only on a PUSCH whose priority is greater than or equal to 2. As described above, a smaller ID of a logical channel indicates a higher priority of the logical channel. Therefore, based on the foregoing technical solution, it can be ensured that data of a logical channel with a higher priority (which represents the logical channel 1 herein) is definitely carried on a resource of a PUSCH with a higher priority (namely, the PUSCH whose priority is less than or equal to 1), thereby ensuring better and more reliable transmission of the data of the logical channel with the higher priority.

In S230, the terminal device may generate the MAC PDU for the first logical channel set by using logical channel prioritization (LCP) in a conventional technology.

An LCP procedure includes the following steps.

(1) Logical Channel Filtering.

Specifically, the terminal device selects a logical channel based on a feature of the first PUSCH, including whether the first PUSCH is a Type-1 configured grant PUSCH, a corresponding subcarrier spacing (SCS), a time domain symbol length, and the like, where data on the logical channel can be carried on the first PUSCH.

(2) Smallest Data Amount Bj Update.

Specifically, the terminal device calculates, based on a prioritized bit rate prioritisedBitRate, bucketSizeDuration, and a time interval T between this Bj update and last Bj update, a smallest amount Bj of data that needs to be transmitted on each logical channel.

(3) Prioritization.

The terminal device inserts, in descending order of priorities of logical channels, data, whose data amount is Bj, in each logical channel into the MAC PDU. If there is remaining space in the MAC PDU, all remaining data of each logical channel is inserted into the MAC PDU in descending order of the priorities of the logical channels.

For details of the LCP procedure, refer to a conventional technology. Only brief description is provided herein, and details are described.

In conclusion, according to the uplink transmission method provided in this application, a corresponding logical channel set may be determined based on a priority of a PUSCH, and a MAC PDU may further be generated based on the determined logical channel set and sent, thereby resolving a problem of mapping data of a logical channel to a PUSCH after a priority of the PUSCH is introduced. Further, a PUSCH with a higher priority is associated with a logical channel with a higher priority, thereby helping provide differentiated assurance on a delay and reliability.

After a priority of an uplink channel (which is indicated by first information described below) is introduced, if priorities of two uplink channels are the same, and time-frequency resources of the two uplink channels overlap in time domain, how the terminal device performs uplink transmission is another problem that needs to be resolved. Therefore, this application provides another uplink transmission method. The method is described below with reference to FIG. 3.

Figure 3:
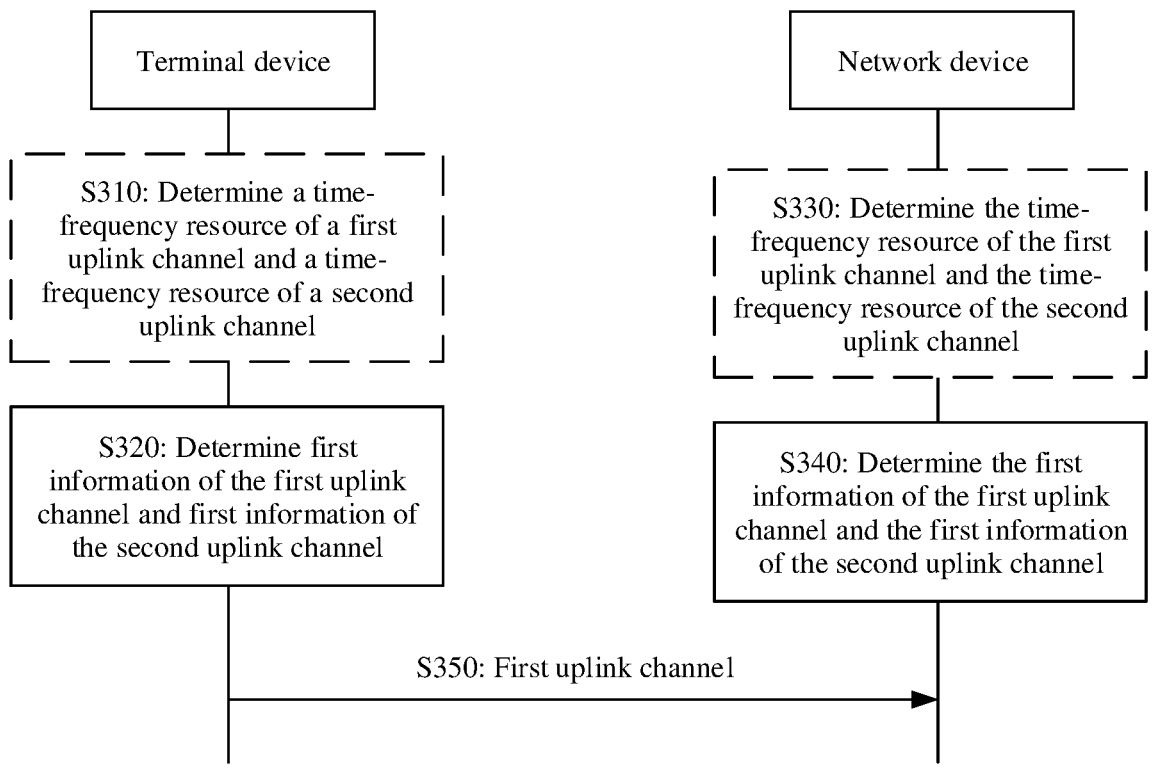
FIG. 3 is a schematic flowchart of another uplink transmission method according to an embodiment of this this application.

FIG. 3 is a schematic flowchart of another uplink transmission method according to this application. The method mainly includes S310, S330, and S350. Optionally, the method may further include S320 and S340. The following describes the steps in detail.

S310: A terminal device determines a time-frequency resource of a first uplink channel and a time-frequency resource of a second uplink channel.

The first uplink channel may be a PUSCH or a PUCCH. The second uplink channel may be a PUSCH or a PUCCH. A time-frequency resource for transmitting a PUCCH may be dynamically scheduled by a network device, or may be configured by using higher layer signaling. A time-frequency resource for transmitting a PUSCH may be dynamically scheduled by the network device, or may be indicated in a configured grant manner.

The time-frequency resource of the first uplink channel and the time-frequency resource of the second uplink channel overlap in time domain. That the time-frequency resource of the first uplink channel and the time-frequency resource of the second uplink channel overlap in time domain may mean that the time-frequency resource of the first uplink channel and the time-frequency resource of the second uplink channel completely overlap in time domain, or may mean that the time-frequency resource of the first uplink channel and the time-frequency resource of the second uplink channel partially overlap in time domain.

S320: The terminal device determines first information of the first uplink channel and first information of the second uplink channel.

The first information of the first uplink channel may indicate a priority of the first uplink channel, and the first information of the second uplink channel may indicate a priority of the second uplink channel. When the priority indicated by the first information of the first uplink channel is higher than the priority indicated by the first information of the second uplink channel, the terminal device sends the first uplink channel and drops the second uplink channel. That the terminal device drops the second uplink channel means that the terminal device does not send the second uplink channel or stops sending the second uplink channel.

When the first information of the first uplink channel is the same as the first information of the second uplink channel, the terminal device may perform S350. Alternatively, when the priority indicated by the first information of the first uplink channel is the same as the priority indicated by the first information of the second uplink channel, the terminal device may perform S350.

S330: The network device determines the time-frequency resource of the first uplink channel and the time-frequency resource of the second uplink channel.

It should be understood that the network device may determine the time-frequency resource of the first uplink channel and the time-frequency resource of the second uplink channel by using a scheduling algorithm or a preset rule.

S340: The network device determines the first information of the first uplink channel and the first information of the second uplink channel.

When the priority indicated by the first information of the first uplink channel is higher than the priority indicated by the first information of the second uplink channel, the network device may receive the first uplink channel, but does not receive the second uplink channel.

When the first information of the first uplink channel is the same as the first information of the second uplink channel, the network device may perform S350. Alternatively, when the priority indicated by the first information of the first uplink channel is the same as the priority indicated by the first information of the second uplink channel, the network device may perform S350.

S350: When the first uplink channel and the second uplink channel satisfy a first condition, the terminal device sends the first uplink channel and drops the second uplink channel. Correspondingly, when the first uplink channel and the second uplink channel satisfy the first condition, the network device receives the first uplink channel, but does not receive the second uplink channel.

According to the method in this embodiment of this application, if time-frequency resources of two uplink channels overlap in time domain, and first information of the two uplink channels is the same or priorities determined based on the first information are the same, the terminal device may perform uplink transmission based on whether the two uplink channels satisfy the first condition, thereby resolving a problem that the terminal device does not know how to perform uplink transmission in a scenario in which the priorities of the two uplink channels whose time-frequency resources overlap in time domain are the same.

The following first describes the first information involved in the method 300.

Optionally, first information of a PUSCH may be the information, used to determine the first priority, described in the method 200. For details, refer to the description in the method 200, and details are not described herein again.

In addition, the first information of the PUSCH may alternatively be a logical channel set corresponding to the PUSCH.

Optionally, first information of a PUCCH is different based on different types of information carried on the PUCCH, and details are described below.

1. The PUCCH is used to carry HARQ feedback information.

The HARQ feedback information is for a PDSCH dynamically scheduled or dynamically activated by using DCI #2, and the first information may be at least one of the following information: a value 111 a first bit field in the DCI #2, a format of the DCI #2, an RNTI corresponding to the DCI #2, an ID of a search space in which the DCI #2 is located, or an ID of a control resource set in which the DCI #2 is located.

In this application, a priority of the HARQ feedback information may be determined based on the first information, and the priority of the HARQ feedback information is a priority of the PUCCH carrying the HARQ feedback information. When the PUCCH is used to carry the HARQ feedback information of the PDSCH dynamically scheduled by using the DCI #2, the value 111 the first bit field in the DCI #2 is the priority of the HARQ feedback information. When the PUCCH is used to carry HARQ feedback information of an SPS PDSCH, a value 111 a first bit field in DCI #2 for activating the SPS PDSCH is a priority of the HARQ feedback information, or a value 111 a first bit field in DCI #2 for activating the SPS PDSCH is a configuration ID of the SPS PDSCH. Optionally, there is a mapping relationship between the configuration ID of the SPS PDSCH and the priority of the HARQ feedback information of the SPS PDSCH.

Optionally, when only one SPS PDSCH configuration is supported, the first information is a first parameter in a configuration parameter of the SPS PDSCH, and the first parameter is the priority of the HARQ feedback information of the SPS PDSCH.

It should be understood that a PDSCH activated by using DCI is the SPS PDSCH.

The SPS PDSCH is similar to a Type-2 configured grant PUSCH, except that the SPS PDSCH is a downlink data channel and the Type-2 configured grant PUSCH is an uplink data channel. The SPS PDSCH needs to be activated by using DCI, and the DCI may indicate a part of parameters of PDSCH transmission, such as a time domain position, a frequency domain resource, and a modulation and coding scheme of the first PDSCH transmission. Some other parameters, such as a periodicity and a repetition quantity, may be indicated by an RRC layer parameter. The terminal device receives the PDSCH on a corresponding time-frequency resource at an interval of one periodicity based on the DCI by using a same transmission solution.

2. The PUCCH is used to carry an SR.

In this case, the first information may be at least one of the following information: a first parameter in an SR configuration corresponding to the SR, an ID of the SR configuration, a transmission periodicity of the SR configuration, or a transmission length of the SR configuration.

A priority of the SR may be determined based on the first information, and the priority of the SR is a priority of the PUCCH carrying the SR.

The first parameter may explicitly indicate the priority of the SR. For example, the first parameter is 1, 2, or another value indicating the priority.

The ID of the SR configuration is associated with the priority of the SR. For example, a priority of the SR may correspond to an ID set of the SR configuration, so that the priority of the SR can be determined based on an ID, corresponding to the SR, of the SR configuration. For example, when the priority of the SR is 1, a corresponding ID set of the SR configuration is {1, 2, 3}. In other words, an ID set, corresponding to an SR whose priority is 1, of the SR configuration is {1, 2, 3}. In this case, if an ID, corresponding to an SR, of the SR configuration is 2, it can be determined that a priority of the SR is 1.

The transmission periodicity of the SR configuration is an interval at which the SR is transmitted, and is equivalent to a transmission periodicity of a PUCCH carrying the SR configuration. The transmission periodicity of the SR configuration is associated with the priority of the SR, so that the priority, corresponding to the SR configuration, of the SR can be determined based on the transmission periodicity of the SR configuration.

Optionally, when the transmission periodicity of the PUCCH is less than or equal to a threshold #1, the priority of the SR is 1; and when the transmission periodicity of the PUCCH is greater than the threshold #1, the priority of the SR is 2. The threshold #1 is a parameter that is predefined or that is configured by a higher layer.

Optionally, each priority of the SR may correspond to a first threshold and a second threshold. If a transmission periodicity of an SR configuration is greater than a first threshold, and is less than or equal to a corresponding second threshold, the transmission periodicity of the SR configuration corresponds to a priority, corresponding to the first threshold and the second threshold, of the SR. The following uses an example for description with reference to Table 4.

Table 4 shows a correspondence between a priority of an SR and each of a first threshold and a second threshold.

TABLE 4

| Priority of the SR | First threshold | Second threshold |
|---|---|---|
| 1 | $A_1$ | $B_1$ |
| 2 | $A_2$ | $B_2$ |
| 3 | $A_3$ | $B_3$ |
| ... | ... | |

Refer to Table 4. If a transmission periodicity of an SR configuration is greater than A1 and less than or equal to B1, a priority, corresponding to the SR configuration, of the SR is 1. If a transmission periodicity of an SR configuration is greater than A2 and is less than or equal to B2, a priority, corresponding to the SR configuration, of the SR is 2. If a transmission periodicity of an SR configuration is greater than A3 and is less than or equal to B3, a priority, corresponding to the SR configuration, of the SR is 3. It may be understood that A2≥B1, and A3≥B2.

The transmission length of the SR configuration is a quantity of resources occupied by the SR in time domain, and is equivalent to a time domain length of a PUCCH carrying the SR configuration. The transmission length of the SR configuration is associated with the priority of the SR, so that a priority of an SR can be determined based on a transmission length, corresponding to the SR, of an SR configuration.

Optionally, when the time domain length of the PUCCH is less than or equal to a threshold #2, the priority of the SR is 1; and when the time domain length of the PUCCH is greater than the threshold #2, the priority of the SR is 2. The threshold #2 is a parameter that is predefined or that is configured by a higher layer.

Optionally, each priority of the SR may correspond to a third threshold and a fourth threshold. If a transmission length of an SR configuration is greater than a third threshold, and is less than or equal to a corresponding fourth threshold, the transmission length of the SR configuration corresponds to a priority, corresponding to the third threshold and the fourth threshold, of the SR. It should be understood that this technical solution is similar to the technical solution shown in Table 4. For details, refer to the foregoing description of Table 4, and details are not described herein again.

3. The PUCCH is used to carry CSI.

In this case, the first information may be at least one of the following information: a second parameter in a CSI report configuration corresponding to the CSI, an ID of the CSI report configuration, or a CQI table in the CSI report configuration.

A priority of the CSI may be determined based on the first information, and the priority of the CSI is a priority of the PUCCH carrying the CSI.

The second parameter may explicitly indicate the priority of the CSI. For example, the second parameter is 1, 2, or another value indicating the priority.

The ID of the CSI report configuration is associated with the priority of the CSI. For example, a priority of the CSI may correspond to an ID set of the CSI report configuration, so that the priority of the CSI can be determined based on an ID, corresponding to the CSI, of the CSI report configuration. For example, when the priority of the CSI is 1, a corresponding ID set of the CSI report configuration is {1, 2, 3}. In other words, an ID set, corresponding to CSI whose priority is 1, of the CSI report configuration is {1, 2, 3}. In this case, if an ID, corresponding to CSI, of the CSI report configuration is 3, it can be determined that a priority of the CSI is 1.

Similarly, the CQI table in the CSI report configuration may be associated with the priority of the CSI, so that a priority of CSI can be determined based on a CQI table, corresponding to the CSI, in the CSI report configuration. For example, a priority of the CSI may correspond to a CQI table set in the CSI report configuration. For example, when the CQI table set in the CSI report configuration is {Table 1}, a corresponding priority of the CSI is 1. When the CQI table set in the CSI report configuration is {Table 2, Table 3}, a corresponding priority of the CSI is 2. Optionally, spectral efficiency of a lowest index element in Table 1 is less than spectral efficiency of a lowest index element in Table 2 and Table 3. In other words, a CQI table set corresponding to CSI whose priority is 1 is {Table 1}. If a CQI table, corresponding to CSI, in the CSI report configuration is Table 1, it can be determined that a priority of the CSI is 1.

The following describes possible meanings of the "first condition" with reference to specific scenarios.

Scenario one: Both the first uplink channel and the second uplink channel are PUSCHs.

Optionally, the first uplink channel and the second uplink channel belong to a same carrier.

Optionally, the first condition is specifically at least one of the following:

- a priority of a logical channel corresponding to the first uplink channel is higher than a priority of a logical channel corresponding to the second uplink channel;
- an equivalent coding rate of the first uplink channel is less than an equivalent coding rate of the second uplink channel;
- when a priority of a logical channel corresponding to the first uplink channel is equal to a priority of a logical channel corresponding to the second uplink channel, an equivalent coding rate of the first uplink channel is less than an equivalent coding rate of the second uplink channel;
- a size of a transport block of the first uplink channel is greater than a size of a transport block of the second uplink channel;
- when a priority of a logical channel corresponding to the first uplink channel is equal to a priority of a logical channel corresponding to the second uplink channel and an equivalent coding rate of the first uplink channel is equal to an equivalent coding rate of the second uplink channel, a size of a transport block of the first uplink channel is greater than a size of a transport block of the second uplink channel;
- DCI corresponding to the first uplink channel is later than DCI corresponding to the second uplink channel in time domain;

a grant manner of the first uplink channel is dynamic scheduling, and a grant manner of the second uplink channel is configured grant; or when a priority of a logical channel corresponding to the first uplink channel is equal to a priority of a logical channel corresponding to the second uplink channel, an equivalent coding rate of the first uplink channel is equal to an equivalent coding rate of the second uplink channel, and a size of a transport block of the first uplink channel is equal to a size of a transport block of the second uplink channel, a grant manner of the first uplink channel is dynamic scheduling, and a grant manner of the second uplink channel is configured grant.

For example, an equivalent coding rate of a PUSCH may be determined based on a modulation and coding scheme of the PUSCH, or may be determined based on a size of a transport block and a quantity of available resources of the PUSCH. For example, the equivalent coding rate of the PUSCH is equal to a modulation order of the PUSCH multiplied by a coding rate of the PUSCH, or is equal to the size of the transport block of the PUSCH divided by a quantity of resource elements (REs) that can be used to carry data and that are on the PUSCH.

A size of a transport block of the PUSCH indicates a quantity of information bits that are not encoded and that can be carried on the PUSCH.

DCI corresponding to the PUSCH is DCI for dynamically scheduling or dynamically activating the PUSCH.

Based on this solution, when two uplink channels are both PUSCHs and have a same priority, subsequent uplink transmission may be performed by performing determining on at least one of relationships between priorities of logical channels separately corresponding to the two uplink channels, equivalent coding rates of the two uplink channels, sizes of transport blocks of the two uplink channels, positions of corresponding DCI in time domain, or grant manners of the two uplink channels.

Optionally, in an embodiment of this application, in the scenario one, S350 may alternatively be replaced with:

When the first uplink channel and the second uplink channel satisfy a first condition, the terminal device processes a grant of the first uplink channel at a MAC layer, to generate a corresponding MAC PDU and send the MAC PDU to a physical layer; and drops a grant of the second uplink channel, that is, does not process the grant of the second uplink channel and does not generate a corresponding MAC PDU.

Specifically, when the priority of the first uplink channel is higher than the priority of the second uplink channel, the terminal device processes the grant of the first uplink channel at the MAC layer, and does not process the grant of the second uplink channel. When the priority of the first uplink channel is lower than the priority of the second uplink channel, the terminal device processes the grant of the second uplink channel at the MAC layer, and does not process the grant of the first uplink channel. When the priority of the first uplink channel is equal to the priority of the second uplink channel, the terminal device further determines whether the first uplink channel and the second uplink channel satisfy the first condition. When the first condition is satisfied, the terminal device processes the grant of the first uplink channel at the MAC layer, and does not process the grant of the second uplink channel. Otherwise, when the first condition is not satisfied, the terminal device processes the grant of the second uplink channel at the MAC layer, and does not process the grant of the first uplink channel.

Based on this technical solution, one grant may be selected, for processing, at the MAC layer, to ensure that the physical layer receives only one MAC PDU and sends only one uplink data channel.

Optionally, the first uplink channel and the second uplink channel belong to different carriers. In this case, in an embodiment of this application, S350 may alternatively be replaced with:

When the first uplink channel and the second uplink channel satisfy a first condition, the terminal device adjusts a transmit power of the second uplink channel, and sends the first uplink channel and the second uplink channel. A sum of a transmit power of the first uplink channel and an adjusted transmit power of the second uplink channel is less than or equal to a maximum transmit power of the terminal device.

Based on this technical solution, the uplink transmission of the two uplink channels may be implemented by adjusting the transmit power of one of the uplink channels.

Scenario two: Both the first uplink channel and the second uplink channel are PUCCHs.

Optionally, the first uplink channel and the second uplink channel belong to a same carrier.

In this scenario, optionally, the first condition is specifically at least one of the following:

both the first uplink channel and the second uplink channel are dynamically scheduled PUCCHs, and DCI for scheduling the first uplink channel is later than DCI for scheduling the second uplink channel;

the first uplink channel is dynamically scheduled, and the second uplink channel is not dynamically scheduled;

a format of the first uplink channel is a format 0 or a format 1, and a format of the second uplink channel is a format 2, a format 3, or a format 4;

a format of the first uplink channel is a format 0 or a format 2, and a format of the second uplink channel is the format 0, a format 3, or a format 4;

a format of the first uplink channel is a format 2, a format 3, or a format 4, a format of the second uplink channel is the format 2, the format 3, or the format 4, and a coding rate of the first uplink channel is less than a coding rate of the second uplink channel; or a time domain length of the first uplink channel is less than a time domain length of the second uplink channel.

The PUCCH that is not dynamically scheduled may be a PUCCH whose transmission is configured. A time domain length of a channel refers to a quantity of symbols commonly used by the channel in time domain.

Optionally, that both the first uplink channel and the second uplink channel are dynamically scheduled PUCCHs, and DCI for scheduling the first uplink channel is later than DCI for scheduling the second uplink channel; may be replaced with: both the first uplink channel and the second uplink channel are dynamically scheduled PUCCHs, both the first uplink channel and the second uplink channel are used to carry HARQ feedback information, and DCI for scheduling the first uplink channel is later than DCI for scheduling the second uplink channel.

Optionally, that the first uplink channel is dynamically scheduled, and the second uplink channel is not dynamically scheduled; may be replaced with: the first uplink channel is dynamically scheduled, transmission of the second uplink channel is configured, the first uplink channel is used to carry HARQ feedback information, and the second uplink channel is used to carry CSI or an SR.

Optionally, a first PUCCH and a second PUCCH correspond to different PUCCH sets, and belong to different carriers. In this case, in an embodiment of this application, S350 may alternatively be replaced with:

When the first uplink channel and the second uplink channel satisfy a first condition, the terminal device adjusts a transmit power of the second uplink channel, and sends the first uplink channel and the second uplink channel. A sum of a transmit power of the first uplink channel and an adjusted transmit power of the second uplink channel is less than or equal to a maximum transmit power of the terminal device.

Based on this technical solution, the uplink transmission of the two uplink channels may be implemented by adjusting the transmit power of one of the uplink channels.

Optionally, in an embodiment of this application, in the scenario two, the sending the first uplink channel and dropping the second uplink channel includes: if the first uplink channel and the second uplink channel do not satisfy a second condition, sending the first uplink channel and dropping the second uplink channel. The second condition is a condition for multiplex transmission of two uplink control channels.

It should be understood that, for details of the second condition, refer to the foregoing related description of the timeline of the UCI MUX. Details are not described herein again.

Scenario three: One of the first uplink channel and the second uplink channel is a PUCCH, and the other is a PUSCH.

In this scenario, optionally, the first condition is specifically at least one of the following:
both the first uplink channel and the second uplink channel are dynamically scheduled, and DCI for scheduling the first uplink channel is later than DCI for scheduling the second uplink channel; or
the first uplink channel is dynamically scheduled, and the second uplink channel is not dynamically scheduled.

A PUCCH that is not dynamically scheduled may be a PUCCH whose transmission is configured, and a PUSCH that is not dynamically scheduled may be a configured grant PUSCH.

Optionally, in an embodiment of this application, in the scenario three, the sending the first uplink channel and dropping the second uplink channel includes: if the first uplink channel and the second uplink channel do not satisfy a third condition, sending the first uplink channel and dropping the second uplink channel. The third condition is a condition for multiplex transmission of an uplink control channel and an uplink data channel.

It should be understood that, for details of the third condition, refer to the foregoing related description of the timeline of the UCI MUX. Details are not described herein again.

For an uplink control channel carrying a HARQ-ACK, when the HARQ-ACK corresponds to dynamically scheduled downlink data transmission, a priority of the uplink control channel may be explicitly indicated by using DCI for scheduling the downlink data transmission. To design a unified solution, when the HARQ-ACK corresponds to semi-persistent scheduling downlink data transmission, the priority of the uplink control channel may be explicitly indicated by using DCI for activating the downlink data transmission, or the priority of the uplink control channel may be explicitly indicated by using a higher layer configuration parameter of the semi-persistent scheduling downlink data transmission. However, for an uplink control channel that carries CSI or an SR, it is not necessary to explicitly indicate a priority of the uplink control channel by using a higher layer parameter. Therefore, a problem of how to effectively perform uplink transmission when time domain resources of the uplink control channel carrying the HARQ-ACK and the uplink control channel carrying the SR or the CSI overlap is not resolved in a conventional technology. For this problem, this application provides an uplink transmission method. The following provides description with reference to an uplink transmission method 400 shown in FIG. 4.

Figure 4:
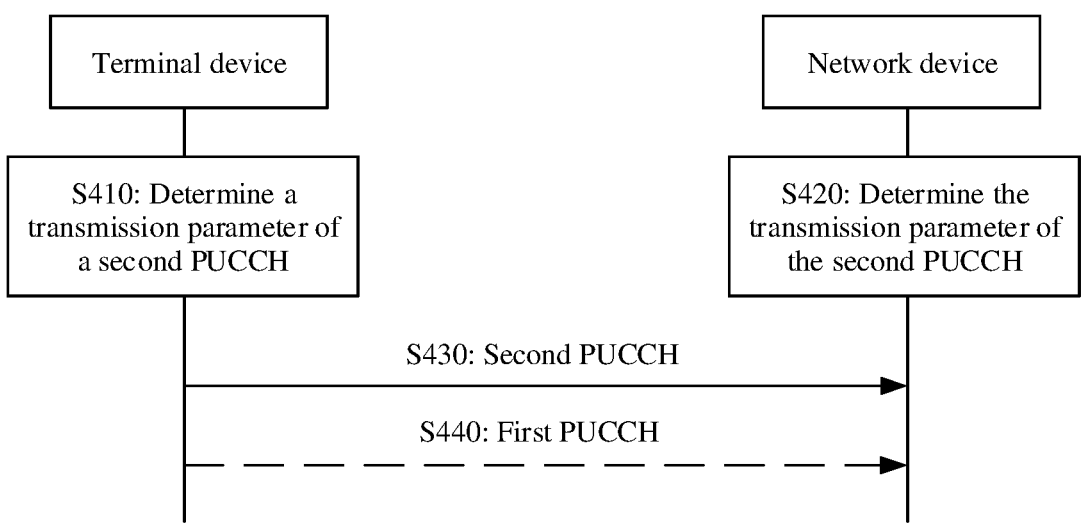
FIG. 4 is a schematic flowchart of still another uplink transmission method according to an embodiment of this this application.

FIG. 4 shows another uplink transmission method 400 according to this application. The method may include S410 to S430. The following describes the steps.

S410: A terminal device determines a transmission parameter of a second PUCCH.

A time-frequency resource of the second PUCCH and a time-frequency resource of a first PUCCH overlap in time domain. The first PUCCH is used to carry HARQ feedback information, and the second PUCCH is used to carry CSI or an SR.

Optionally, the HARQ feedback information carried on the first PUCCH may include HARQ feedback information for a dynamically scheduled PDSCH and/or an SPS PDSCH. S420: A network device determines the transmission parameter of the second PUCCH.

S430: When the transmission parameter of the second PUCCH and a priority parameter of the first PUCCH satisfy a first condition, the terminal device sends the second PUCCH. Correspondingly, when the transmission parameter of the second PUCCH and the priority parameter satisfy the first condition, the network device receives the second PUCCH.

S440: When the transmission parameter of the second PUCCH and the priority parameter of the first PUCCH do not satisfy the first condition, the terminal device sends the first PUCCH. Correspondingly, when the transmission parameter of the second PUCCH and the priority parameter do not satisfy the first condition, the network device receives the first PUCCH.

Specifically, when the time-frequency resource of the first PUCCH and the time-frequency resource of the second PUCCH overlap in time domain, the first PUCCH is used to carry the HARQ feedback information, and the second PUCCH is used to carry the CSI or the SR, the terminal device can determine, based on whether the transmission parameter of the second PUCCH and the priority parameter of the first PUCCH satisfy the first condition, whether to send the first PUCCH or the second PUCCH.

Therefore, according to the method provided in this application, when the PUCCHs carrying two different types of uplink information overlap in time domain, the terminal device can perform uplink transmission based on whether the transmission parameter of the second PUCCH and the priority parameter of the first PUCCH satisfy the first condition. In this way, a problem, in a conventional technology, that when the PUCCHs carrying the two different types of uplink information overlap in time domain, the terminal device does not know how to perform uplink transmission is resolved.

Optionally, in an embodiment of this application, in S430, when determining to send the second PUCCH, the terminal device does not send or stops sending the first PUCCH.

Optionally, in an embodiment of this application, in S440, when determining to send the first PUCCH, the terminal device does not send or stops sending the second PUCCH.

The following separately describes the transmission parameter of the second PUCCH and the first condition when the second PUCCH is used to carry the SR and when the second PUCCH is used to carry the CSI.

1. The second PUCCH is used to carry the SR.

In this case, the transmission parameter of the second PUCCH may include at least one of the following:

an ID of an SR configuration corresponding to the SR, a transmission periodicity of the SR configuration, a time domain length of the second PUCCH, a priority of a logical channel associated with the SR configuration, or an ID of a logical channel associated with the SR configuration.

Correspondingly, when the transmission parameter of the second PUCCH includes the ID of the SR configuration, the priority parameter of the first PUCCH may include a first set; when the transmission parameter of the second PUCCH includes the transmission periodicity of the SR configuration, the priority parameter of the first PUCCH may include a first threshold; when the transmission parameter of the second PUCCH includes the time domain length of the second PUCCH, the priority parameter of the first PUCCH may include a second threshold; when the transmission parameter of the second PUCCH includes the priority of the logical channel associated with the SR configuration, the priority parameter of the first PUCCH may include a third threshold; and when the transmission parameter of the second PUCCH includes the ID of the logical channel associated with the SR configuration, the priority parameter of the first PUCCH may include a fourth threshold and/or a second set.

One or more of the first threshold, the second threshold, the third threshold, the fourth threshold, the first set, and the second set are related to the first PUCCH.

Optionally, the first condition includes at least one of the following:

the ID of the SR configuration belongs to the first set;
the transmission periodicity of the SR configuration is less than or equal to the first threshold;
the time domain length of the second PUCCH is less than or equal to the second threshold;
the priority of the logical channel associated with the SR configuration is greater than the third threshold;
the ID of the logical channel associated with the SR configuration is less than or equal to the fourth threshold; or
the ID of the logical channel associated with the SR configuration belongs to the second set.

In other words, S430 may be specifically: When at least one of the foregoing is true, the terminal device may send the second PUCCH; when the first condition is not satisfied, the terminal device sends the first PUCCH.

2. The second PUCCH is used to carry the CSI.

In this case, the transmission parameter of the second PUCCH may include at least one of the following: a transmission periodicity of a CSI report corresponding to the CSI, a time domain length of the second PUCCH, an ID of the CSI report, or a CQI table corresponding to the CSI report.

Correspondingly, when the transmission parameter of the second PUCCH includes the transmission periodicity of the CSI report, the priority parameter of the first PUCCH may include a fifth threshold; when the transmission parameter of the second PUCCH includes the time domain length of the second PUCCH, the priority parameter of the first PUCCH may include a sixth threshold; when the transmission parameter of the second PUCCH includes the ID of the CSI report, the priority parameter of the first PUCCH may include a third set; and when the transmission parameter of the second PUCCH includes the CQI table corresponding to the CSI report, the priority parameter of the first PUCCH may include a fourth set.

One or more of the fifth threshold, the sixth threshold, the third set, and the fourth set are related to the first PUCCH.

Optionally, the first condition includes at least one of the following:

the transmission periodicity of the CSI report corresponding to the CSI is less than or equal to the fifth threshold;
the time domain length of the second PUCCH is less than or equal to the sixth threshold;
the ID of the CSI report belongs to the third set; or the CQI table corresponding to the CSI report belongs to the fourth set.

In other words, S430 may be specifically: When at least one of the foregoing is true, the terminal device may send the second PUCCH; when the first condition is not satisfied, the terminal device sends the first PUCCH.

In this application, optionally, the priority parameter of the first PUCCH may be configured by a higher layer or predefined.

Optionally, in an implementation of S430, when the first PUCCH and the second PUCCH do not satisfy the second condition, the terminal device sends the second PUCCH when the transmission parameter of the second PUCCH and the priority parameter of the first PUCCH satisfy the first condition. Alternatively, when the first PUCCH and the second PUCCH do not satisfy the second condition, the terminal device sends the first PUCCH when the transmission parameter of the second PUCCH and the priority parameter of the first PUCCH do not satisfy the first condition.

The second condition is a condition for multiplex transmission of two PUCCHs, or the second condition is that a format of the first PUCCH is a format 1, and a format of the second PUCCH is a format 0.

It should be understood that, for details of the condition for multiplex transmission of two PUCCHs, refer to the foregoing related description of the timeline of the UCI MUX. Details are not described herein again.

Optionally, in an embodiment of this application, S430 may alternatively be replaced with: The terminal device does not send or stops sending the first PUCCH and the second PUCCH, and sends, on a third PUCCH, the HARQ feedback information carried on the first PUCCH and the SR or CSI carried on the second PUCCH.

Further, S430 may alternatively be replaced with: When the first PUCCH and the second PUCCH do not satisfy the second condition, the terminal device skips sending or stops sending the first PUCCH and the second PUCCH, and sends, on a third PUCCH, the HARQ feedback information carried on the first PUCCH and the SR or CSI carried on the second PUCCH.

The third PUCCH may be one of the first PUCCH and the second PUCCH, or may be a PUCCH different from the first PUCCH and the second PUCCH. The third PUCCH is determined based on a total quantity of information bits of the HARQ feedback information carried on the first PUCCH and the SR or CSI carried on the second PUCCH.

Figure 5:
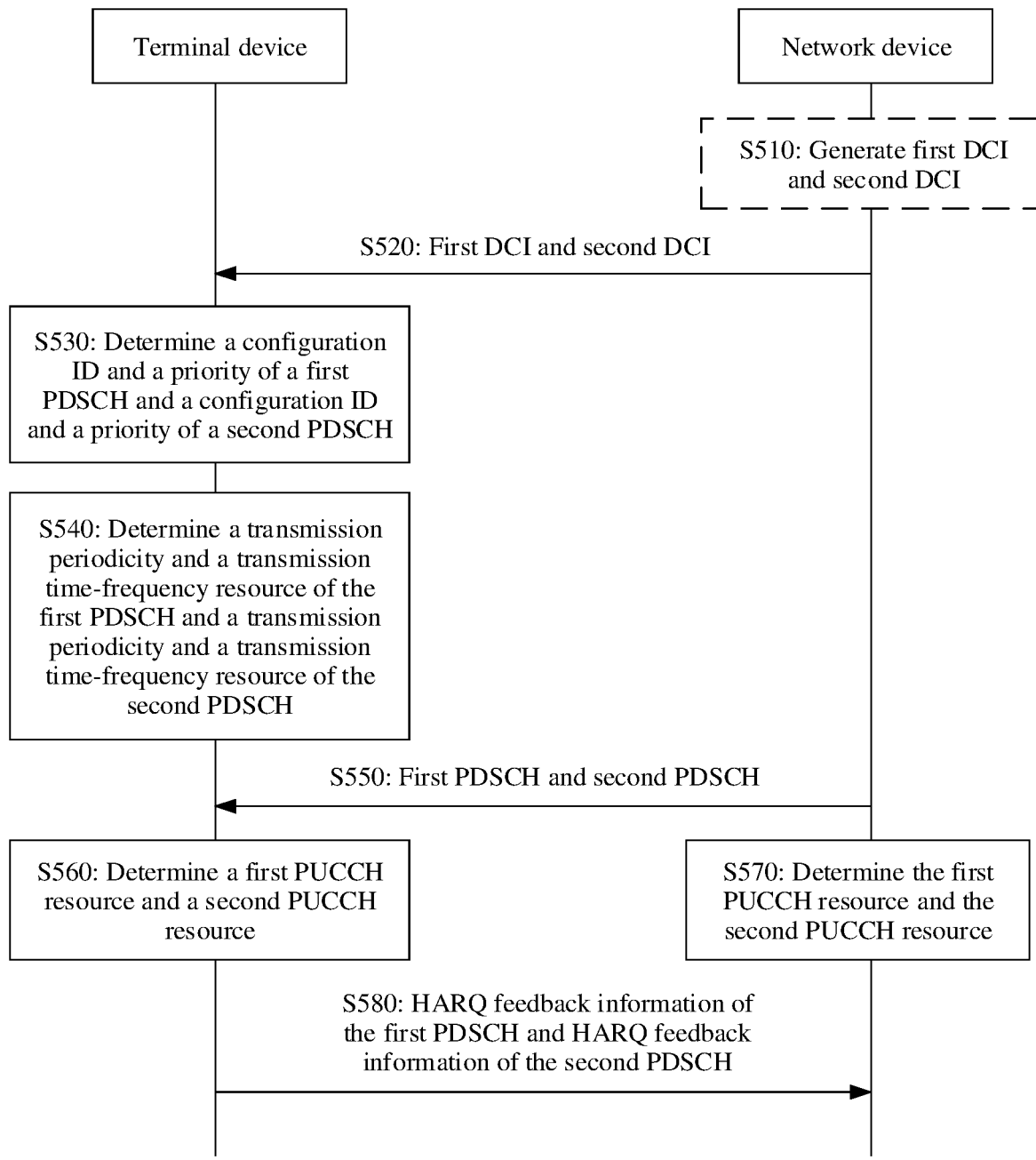
FIG. 5 is a schematic flowchart of yet another uplink transmission method according to an embodiment of this this application.

FIG. 5 shows another uplink transmission method 500 according to this application. The method may include S510 to S530. The following describes the steps.

S510: A network device generates first DCI and second DCI.

S520: The network device sends the first DCI and the second DCI. Correspondingly, a terminal device receives the first DCI and the second DCI.

S530: The terminal device determines a configuration ID and a priority of a first PDSCH based on the first DCI, and determines a configuration ID and a priority of a second PDSCH based on the second DCI.

The first PDSCH and the second PDSCH are SPS PDSCHs. The first DCI includes first indication information, the first indication information is one of the configuration ID and the priority of the first PDSCH, and the other one of the configuration ID and the priority of the first PDSCH is determined by using the first indication information. The second DCI includes second indication information, the second indication information is one of the configuration ID and the priority of the second PDSCH, and the other one of the configuration ID and the priority of the second PDSCH is determined by using the second indication information.

Specifically, when configuring the first PDSCH by using a higher layer parameter, the network device may simultaneously configure the priority of the first PDSCH. When the first DCI includes the configuration ID of the first PDSCH, the first PDSCH is activated, and the terminal device may determine, based on a higher layer configuration parameter of the first PDSCH, a priority corresponding to the configuration ID of the first PDSCH (namely, the priority of the first PDSCH). When the first DCI includes the priority of the first PDSCH, the terminal device may determine, based on a higher layer configuration parameter including the priority of the first PDSCH, that a configuration ID, corresponding to the priority of the first PDSCH, of a PDSCH is the configuration ID of the first PDSCH, so that it may be determined that the first PDSCH is activated.

Similarly, when configuring the second PDSCH by using a higher layer parameter, the network device may simultaneously configure the priority of the second PDSCH. When the second DCI includes the configuration ID of the second PDSCH, the second PDSCH is activated, and the terminal device may determine, based on a higher layer configuration parameter of the second PDSCH, a priority corresponding to the configuration ID of the second PDSCH (namely, the priority of the second PDSCH). When the second DCI includes the priority of the second PDSCH, the terminal device may determine, based on a higher layer configuration parameter including the priority of the second PDSCH, that a configuration ID, corresponding to the priority of the second PDSCH, of a PDSCH is the configuration ID of the second PDSCH, so that it may be determined that the second PDSCH is activated.

Therefore, according to the method provided in this application, one of a priority and a configuration ID of an SPS PDSCH is carried in DCI, so that both the priority and the configuration ID of the SPS PDSCH can be simultaneously indicated, thereby reducing signaling overheads.

Optionally, the method may further include S540 and S550.

S540: The terminal device determines a transmission periodicity of the first PDSCH based on the configuration ID of the first PDSCH, and determines a transmission time-frequency resource of the first PDSCH based on the transmission periodicity of the first PDSCH and resource indication information in the first DCI; and determines a transmission periodicity of the second PDSCH based on the configuration ID of the second PDSCH, and determines a transmission time-frequency resource of the second PDSCH based on the transmission periodicity of the second PDSCH and resource indication information in the second DCI.

Specifically, the terminal device may determine a time-frequency resource for the first transmission of the first PDSCH based on the resource indication information in the first DCI, determine the transmission periodicity of the first PDSCH based on the configuration ID of the first PDSCH, and determine a time-frequency resource for subsequent transmission of the first PDSCH based on the time-frequency resource for the first transmission of the first PDSCH and the transmission periodicity of the first PDSCH. Similarly, the terminal device may determine a time-frequency resource for the first transmission of the second PDSCH based on the resource indication information in the second DCI, determine the transmission periodicity of the second PDSCH based on the configuration ID of the second PDSCH, and determine a time-frequency resource for subsequent transmission of the second PDSCH based on the time-frequency resource for the first transmission of the second PDSCH and the transmission periodicity of the second PDSCH.

S550: The network device sends the first PDSCH based on the transmission time-frequency resource of the first PDSCH, and sends the second PDSCH based on the transmission time-frequency resource of the second PDSCH. Correspondingly, the terminal device receives the first PDSCH based on the transmission time-frequency resource of the first PDSCH, and receives the second PDSCH based on the transmission time-frequency resource of the second PDSCH.

Optionally, the method may further include S560 to S580.

S560: The terminal device determines a first PUCCH resource corresponding to the first PDSCH and a second PUCCH resource corresponding to the second PDSCH, where the first PUCCH resource is used to carry HARQ feedback information of the first PDSCH, and the second PUCCH resource is used to carry HARQ feedback information of the second PDSCH.

S570: The network device determines the first PUCCH resource corresponding to the first PDSCH and the second PUCCH resource corresponding to the second PDSCH.

S580: When the first PUCCH resource and the second PUCCH resource overlap in time domain, the terminal device sends the HARQ feedback information of the first PDSCH and the HARQ feedback information of the second PDSCH by using a third PUCCH resource. Correspondingly, the network device receives the HARQ feedback information of the first PDSCH and the HARQ feedback information of the second PDSCH on the third PUCCH resource.

The third PUCCH resource may be one of the first PUCCH resource and the second PUCCH resource, or may be a PUCCH resource different from the first PUCCH resource and the second PUCCH resource.

In an embodiment of this application, S580 may be replaced with:

When the first PUCCH resource and the second PUCCH resource overlap in time domain, the terminal device sends the HARQ feedback information of the first PDSCH by using the first PUCCH resource, and stops sending, by using the second PUCCH resource, the HARQ feedback information of the second PDSCH. A priority of the first PDSCH is higher than a priority of the second PDSCH. Correspondingly, the network device receives the HARQ feedback information of the first PDSCH on the first PUCCH resource.

In an embodiment of this application, S580 may be replaced with the following:

When the first PUCCH resource and the second PUCCH resource overlap in time domain, and the first PUCCH and the second PUCCH do not satisfy a multiplexing condition, the terminal device sends the HARQ feedback information of the first PDSCH by using the first PUCCH resource, and stops sending, by using the second PUCCH resource, the HARQ feedback information of the second PDSCH. A priority of the first PDSCH is higher than a priority of the second PDSCH. Correspondingly, the network device receives the HARQ feedback information of the first PDSCH on the first PUCCH resource. For the multiplexing condition of the two uplink control channels, refer to the foregoing related description of the timeline of the UCI MUX. Details are not described herein again. According to the method provided in this embodiment of this application, the terminal device may determine a priority of an SPS PDSCH, and feed back HARQ feedback information for the SPS PDSCH based on the priority of the SPS PDSCH.

The foregoing mainly describes the methods provided in this application with reference to FIG. 2 to FIG. 5. The following describes apparatuses according to this application.

Figure 6:
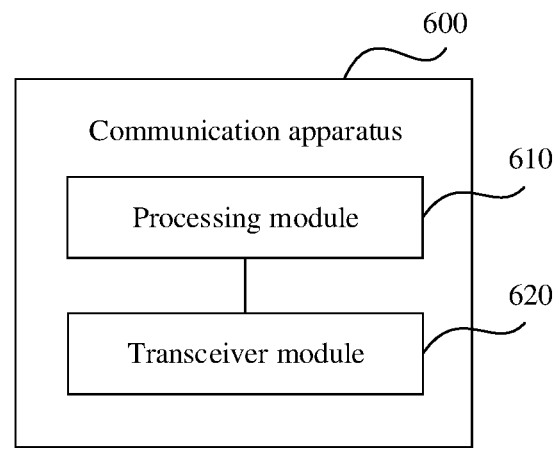
FIG. 6 is a schematic structural diagram of a communication apparatus according to an embodiment of this this application.

FIG. 6 is a schematic block diagram of a communication apparatus 400 according to an embodiment of this application. As shown in FIG. 6, the communication apparatus 400 may include a processing module 610 and a transceiver module 620.

In a possible design, the communication apparatus 600 may correspond to the terminal device in the foregoing method embodiments, for example, may be a terminal device or a chip configured in the terminal device. When the communication apparatus is the terminal device, the processing module may be a processor, and the transceiver module may be a transceiver. The communication apparatus may further include a storage module, and the storage module may be a memory. The storage module is configured to store instructions, and the processing module executes the instructions stored in the storage module, to enable the communication apparatus to perform the foregoing methods. When the communication apparatus is the chip in the terminal device, the processing module may be a processor, and the transceiver module may be an interface circuit, an input/output interface, a pin, a circuit, or the like. The processing module executes instructions stored in a storage module, to enable the communication apparatus to perform the operations performed by the terminal device in the foregoing methods. The storage module may be a storage module (for example, a register or a cache) in the chip, or may be a storage module (for example, a read-only memory or a random access memory) that is outside the chip and that is inside the communication apparatus.

In an implementation, the modules in the communication apparatus 600 and the foregoing other operations and/or functions are used to implement corresponding procedures of the method in FIG. 2. Specifically, the processing module 610 may be configured to perform S210 to S230 in the method shown in FIG. 2, and the transceiver module 620 may be configured to perform S240 in the method shown in FIG. 2.

In another implementation, the modules in the communication apparatus 600 and the foregoing other operations and/or functions are used to implement corresponding procedures of the method shown in FIG. 3. Specifically, the processing module 610 may be configured to perform S310 and S320 in the method shown in FIG. 3, and the transceiver module 620 may be configured to perform S350 in the method shown in FIG. 3.

In still another implementation, the modules in the communication apparatus 600 and the foregoing other operations and/or functions are used to implement corresponding procedures of the method in FIG. 4. Specifically, the processing module 610 may be configured to perform S410 in the method shown in FIG. 4, and the transceiver module 620 may be configured to perform S430 or S440 in the method shown in FIG. 4.

In still another implementation, the modules in the communication apparatus 600 and the foregoing other operations and/or functions are used to implement corresponding procedures of the method in FIG. 5. Specifically, the processing module 610 may be configured to perform S530, S540, and S560 in the method shown in FIG. 5, and the transceiver module 620 may be configured to perform S520, S550, and S580 in the method shown in FIG. 5.

In another possible design, the communication apparatus 600 may correspond to the network device in the foregoing method embodiments, for example, may be a network device or a chip configured in the network device. When the communication apparatus is the network device, the processing module may be a processor, and the transceiver module may be a transceiver. The communication apparatus may further include a storage module, and the storage module may be a memory. The storage module is configured to store instructions, and the processing module executes the instructions stored in the storage module, to enable the communication apparatus to perform the foregoing methods. When the communication apparatus is the chip in the network device, the processing module may be a processor, and the transceiver module may be an interface circuit, an input/output interface, a pin, a circuit, or the like. The processing module executes instructions stored in a storage module, to enable the communication apparatus to perform the operations performed by the network device in the foregoing methods. The storage module may be a storage module (for example, a register or a cache) in the chip, or may be a storage module (for example, a read-only memory or a random access memory) that is outside the chip and that is inside the communication apparatus.

In an implementation, the modules in the communication apparatus 600 and the foregoing other operations and/or functions are used to implement corresponding procedures of the method in FIG. 2. Specifically, the transceiver module 620 may be configured to perform S240 in the method shown in FIG. 2.

In yet an implementation, the modules in the communication apparatus 600 and the foregoing other operations and/or functions are used to implement corresponding procedures of the method in FIG. 3. Specifically, the processing module 610 may be configured to perform S330 and S340 in the method shown in FIG. 3, and the transceiver module 620 may be configured to perform S350 in the method shown in FIG. 3.

In still another implementation, the modules in the communication apparatus 600 and the foregoing other operations and/or functions are used to implement corresponding procedures of the method in FIG. 4. Specifically, the processing module 610 may be configured to perform S420 in the method shown in FIG. 4, and the transceiver module 620 may be configured to perform S430 or S440 in the method shown in FIG. 4.

In still another implementation, the modules in the communication apparatus 600 and the foregoing other operations and/or functions are used to implement corresponding procedures of the method in FIG. 5. Specifically, the processing module 610 may be configured to perform S510 and S570 in the method shown in FIG. 5, and the transceiver module 620 may be configured to perform S520, S550, and S580 in the method shown in FIG. 5.

The network device and the terminal device in the foregoing apparatus embodiments correspond to the network device and the terminal device in the method embodiments. A corresponding module or unit performs a corresponding step. For example, the transceiver module (transceiver) performs a sending step and/or a receiving step in the method embodiments, and a step other than the sending step and the receiving step may be performed by the processing module (processor). For a function of a specific unit, refer to a corresponding method embodiment. The transceiver module may include a sending unit and/or a receiving unit, and the transceiver may include a transmitter and/or a receiver, to separately implement a receiving function and a sending function. There may be one or more processing modules.

It should be understood that the foregoing module division is merely functional division, and there may be another division method in actual implementation.

The terminal device or the network device may be a chip, and the processing module may be implemented by hardware or software. When being implemented by the hardware, the processing module may be a logic circuit, an integrated circuit, or the like. When being implemented by the software, the processing module may be a general-purpose processor, and is implemented by reading software code stored in a storage unit. The storage module may be integrated into the processor, or may be located outside the processor and exist independently.

Figure 7:
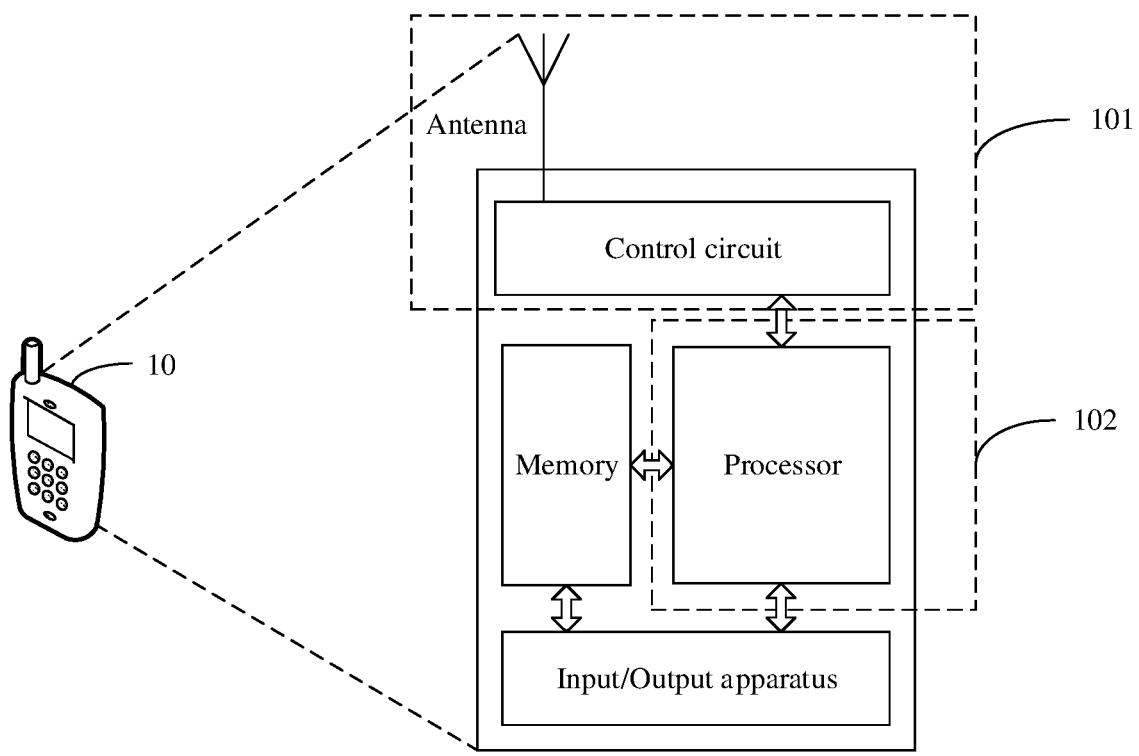
FIG. 7 is a schematic structural diagram of a terminal device according to an embodiment of this this application.

FIG. 7 is a schematic structural diagram of a terminal device 10 according to this application. For ease of description, FIG. 7 shows only main components of the terminal device. As shown in FIG. 7, the terminal device 10 includes a processor, a memory, a control circuit, an antenna, and an input/output apparatus.

The processor is mainly configured to process a communication protocol and communication data, control the entire terminal device, execute a software program, and process data of the software program, for example, configured to support the terminal device in performing actions described in the foregoing method embodiments. The memory is configured to store the software program and the data. The control circuit is mainly configured to: perform conversion between a baseband signal and a radio frequency signal, and process the radio frequency signal. A combination of the control circuit and the antenna may also be referred to as a transceiver that is mainly configured to send and receive a radio frequency signal in an electromagnetic wave form. The input/output apparatus, such as a touchscreen, a display screen, or a keyboard, is mainly configured to receive data entered by a user, and output data to the user.

After the terminal device is powered on, the processor may read the software program in a storage unit, explain and execute instructions of the software program, and process the data of the software program. When data needs to be sent wirelessly, the processor performs baseband processing on the to-be-sent data, and then outputs a baseband signal to the radio frequency circuit. The radio frequency circuit performs radio frequency processing on the baseband signal, and then sends, by using the antenna, a radio frequency signal in an electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 7 shows only one memory and one processor. An actual terminal device may have a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 7 integrates functions of the baseband processor and the central processing unit. A person skilled in the art may understand that the baseband processor and the central processing unit may be separate processors, and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communication protocol and communication data may be embedded into the processor, or may be stored in the storage unit in a form of a software program, so that the processor executes the software program to implement a baseband processing function.

For example, in this embodiment of this application, the antenna and the control circuit that have receiving and sending functions may be considered as a transceiver unit 101 of the terminal device 10, and the processor having a processing function may be considered as a processing unit 102 of the terminal device 10. As shown in FIG. 7, the terminal device 10 includes the transceiver unit 101 and the processing unit 102. The transceiver unit may also be referred to as a transceiver, a transceiver machine, a transceiver apparatus, or the like. Optionally, a component that is in the transceiver unit 101 and that is configured to implement a receiving function may be considered as a receiving unit, and a component that is in the transceiver unit 101 and that is configured to implement a sending function may be considered as a sending unit. In other words, the transceiver unit 101 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like.

The terminal device shown in FIG. 7 may perform the actions performed by the terminal device in the foregoing methods. To avoid repetition, detailed description thereof is omitted herein.

Figure 8:
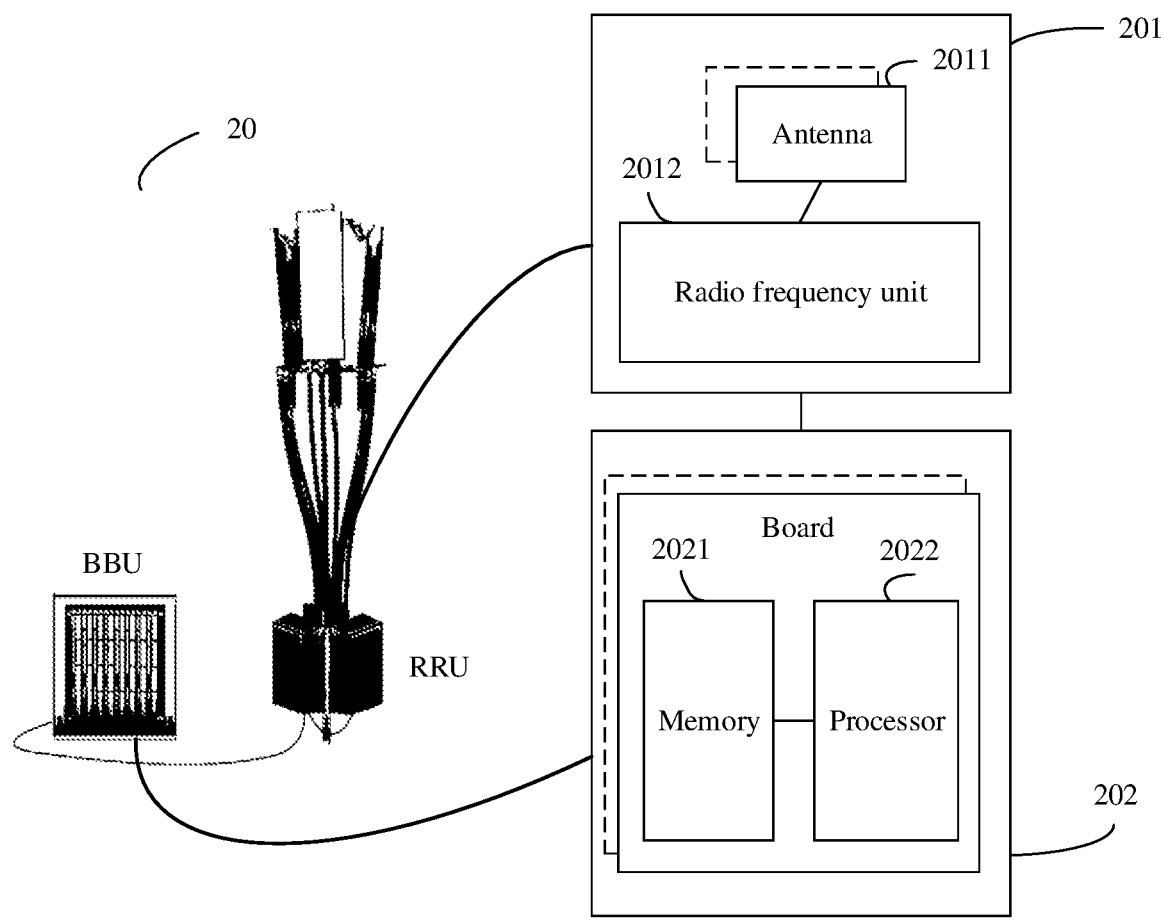
FIG. 8 is a schematic structural diagram of a network device according to an embodiment of this this application.

FIG. 8 is a schematic structural diagram of a network device according to this application. The network device may be, for example, a base station 20. As shown in FIG. 8, the base station may be applied to the communication system shown in FIG. 1, to perform a function of the network device in the foregoing method embodiments. The base station 20 may include one or more radio frequency units, such as a remote radio unit (RRU) 201 and one or more baseband units (BBU) (which may also be referred to as digital units (DU)) 202. The RRU 201 may be referred to as a transceiver unit, a transceiver machine, a transceiver circuit, a transceiver, or the like, and may include at least one antenna 2011 and a radio frequency unit 2012. The RRU 201 part is mainly configured to receive and send a radio frequency signal and perform conversion between a radio frequency signal and a baseband signal, for example, configured to send the BFR configuration in the foregoing method embodiment. The BBU 202 is mainly configured to perform baseband processing, control the base station, and the like. The RRU 201 and the BBU 202 may be physically disposed together, or may be physically separated, that is, in a distributed base station.

The BBU 202 is a control center of the base station, may also be referred to as a processing unit, and is mainly configured to complete baseband processing functions such as channel coding, multiplexing, modulation, and spectrum spreading. For example, the BBU (the processing unit) 202 may be configured to control the base station to perform an operation procedure related to the network device in the method embodiments.

In an embodiment, the BBU 202 may include one or more boards. A plurality of boards may jointly support a radio access network (such as an LTE network) of a single access standard, or may separately support radio access networks (such as an LTE network, a 5G network, or another network) of different access standards. The BBU 202 further includes a memory 2021 and a processor 2022. The memory 2021 is configured to store necessary instructions and necessary data. The processor 2022 is configured to control the base station to perform a necessary action, for example, is configured to control the base station to perform an operation procedure related to the network device in the foregoing method embodiment. The memory 2021 and the processor 2022 may serve the one or more boards. To be specific, a memory and a processor may be separately disposed on each board. Alternatively, a plurality of boards may share a same memory and a same processor. In addition, a necessary circuit may further be disposed on each board.

In addition, the network device is not limited to the foregoing forms, and may also be in another form. For example, the network device includes a BBU and an adaptive radio unit (ARU), or includes a BBU and an active antenna unit (AAU), or may be customer-premises equipment (CPE), or may be in another form. This is not limited in this application.

It should be noted that, the processor in the embodiments of this application may be an integrated circuit chip, and has a signal processing capability. In an implementation process, the steps in the foregoing method embodiments may be implemented by using a hardware integrated logic circuit in the processor, or by using instructions in a form of software. The foregoing processor may be a general-purpose processor, a digital signal processor (DSP), an application specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly performed and completed by using a hardware decoding processor, or may be performed and completed by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It can further be understood that the memory in the embodiments of this application may be a volatile memory or a nonvolatile memory, or may include a volatile memory and a nonvolatile memory. The non-volatile memory may be a read-only memory ROM, a programmable read-only memory (PROM), an erasable programmable read-only memory (EPROM), an electrically erasable programmable read-only memory (EEPROM), or a flash memory. The volatile memory may be a random access memory (RAM) that is used as an external buffer. Through example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

According to the method provided in the embodiments of this application, this application further provides a computer program product. The computer program product includes computer program code. When the computer program code is run on a computer, the computer is enabled to perform the methods described above.

According to the methods provided in the embodiments of this application, this application further provides a computer-readable medium. The computer-readable medium stores program code. When the program code is run on a computer, the computer is enabled to perform the methods described above.

According to the method provided in the embodiments of this application, this application further provides a system. The system includes the foregoing one or more terminal devices and the foregoing one or more network devices.

All or some of the foregoing embodiments may be implemented by using software, hardware, firmware, or any other combination. When software is used to implement the embodiments, all or some of the foregoing embodiments may be implemented in a form of a computer program product. The computer program product includes one or more computer instructions. When the computer program instructions are loaded or executed on a computer, the procedures or functions according to the embodiments of the present invention are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium. The semiconductor medium may be a solid-state drive.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should be understood that, in the embodiments of the present invention, "when" and "if" both refer to that the terminal device or the network device performs corresponding processing in an objective case, and do not limit time, and do not require the terminal device or the network device to perform a determining action during implementation, and do not mean there is another limitation.

The term "and/or" in this specification describes only an association relationship for describing associated objects and represents that three relationships may exist. For example, A and/or B may represent the following three cases: Only A exists, both A and B exist, and only B exists.

The term "at least one of", "at least one type of", or "at least one item of" in this specification indicates all of or any combination of the listed items, for example, "at least one of A, B, and C" may indicate the following six cases: Only A exists, only B exists, only C exists, both A and B exist, both B and C exist, and A, B and C all exist.

It should be understood that in the embodiments of this application, "B corresponding to A" represents that B is associated with A, and B may be determined based on A. However, it should further be understood that determining B based on A does not mean that B is determined based on only A. B may alternatively be determined based on A and/or other information.

A person of ordinary skill in the art may be aware that, in combination with the examples described in the embodiments disclosed in this specification, units and algorithm steps can be implemented by electronic hardware or a combination of computer software and electronic hardware. Whether the functions are performed by the hardware or the software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the foregoing described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

In the embodiments of this application, unless otherwise stated or there is a logic conflict, terms and/or description between different embodiments are/is consistent and may be mutually referenced, and technical features in different embodiments may be combined based on an internal logical relationship thereof, to form a new embodiment.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for indicating a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing description is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, performed by a terminal device or a module in the terminal device, the method comprising:
   receiving first downlink control information (DCI) and second DCI, wherein the first DCI indicates a configuration identifier (ID) of a first physical downlink shared channel (PDSCH) that activates the first PDSCH, the second DCI indicates a configuration ID of a second PDSCH that activates the second PDSCH, and the first PDSCH and the second PDSCH are semi-persistent scheduling (SPS) PDSCHs;
   determining a first physical uplink control channel (PUCCH) resource corresponding to the first PDSCH, and determining a second PUCCH resource corresponding to the second PDSCH, wherein the first PUCCH resource is used to carry hybrid automatic repeat request (HARQ) feedback information of the first PDSCH, and the second PUCCH resource is used to carry HARQ feedback information of the second PDSCH; and
   in response to the first PUCCH resource and the second PUCCH resource overlapping in time domain, and a priority of the first PDSCH being higher than a priority of the second PDSCH, sending, the HARQ feedback information of the first PDSCH through the first PUCCH resource, and cancelling sending the HARQ feedback information of the second PDSCH through the second PUCCH resource, wherein the priority of the first PDSCH is equal to a priority of the HARQ feedback information of the first PDSCH, and the priority of the HARQ feedback information of the first PDSCH is equal to a priority of the first PUCCH; and the priority of the second PDSCH is equal to a priority of the HARQ feedback information of the second PDSCH, and the priority of the HARQ feedback information of the second PDSCH is equal to a priority of the second PUCCH.

2. The method according to claim 1, wherein the method further comprises:
determining a transmission periodicity of the first PDSCH based on the configuration ID of the first PDSCH, and determining a time-frequency resource of the first PDSCH based on the transmission periodicity of the first PDSCH and resource indication information in the first DCI; and
determining a transmission periodicity of the second PDSCH based on the configuration ID of the second PDSCH, and determining a time-frequency resource of the second PDSCH based on the transmission periodicity of the second PDSCH and resource indication information in the second DCI.

3. The method according to claim 2, wherein,
the determining the time-frequency resource of the first PDSCH based on the transmission periodicity of the first PDSCH and the resource indication information in the first DCI comprises:
determining a time-frequency resource for first transmission of the first PDSCH based on the resource indication information in the first DCI, and determining the time-frequency resource of the first PDSCH based on the transmission periodicity of the first PDSCH and the time-frequency resource for the first transmission of the first PDSCH; and
the determining the time-frequency resource of the second PDSCH based on the transmission periodicity of the second PDSCH and the resource indication information in the second DCI comprises:
determining a time-frequency resource for first transmission of the second PDSCH based on the resource indication information in the second DCI, and determining the time-frequency resource of the second PDSCH based on the transmission periodicity of the second PDSCH and the time-frequency resource for the first transmission of the second PDSCH.

4. The method according to claim 2, wherein the method further comprises:
receiving the first PDSCH on the time-frequency resource of the first PDSCH, and generating the HARQ feedback information of the first PDSCH; and
receiving the second PDSCH on the time-frequency resource of the second PDSCH, and generating the HARQ feedback information of the second PDSCH.

5. The method according to claim 1, wherein the method further comprises:
receiving, from a network device, a first higher layer parameter used in configuration of the first PDSCH and the priority of the first PDSCH; and
receiving, from the network device, a second higher layer parameter used in configuration of the second PDSCH and the priority of the second PDSCH.

6. The method according to claim 5, wherein the determining the priority of the first PDSCH according to the configuration ID of the first PDSCH, and determining the priority of the second PDSCH according to the configuration ID of the second PDSCH specifically comprises:
determining, according to the first higher layer parameter, the priority of the first PDSCH corresponding to the configuration ID of the first PDSCH; and
determining, according to the second higher layer parameter, the priority of the second PDSCH corresponding to the configuration ID of the second PDSCH.

7. An apparatus comprising:
one or more processors; and
a non-transitory computer readable medium storing instructions that, when executed by the one or more processors, cause the apparatus to:
send first downlink control information (DCI) and second DCI, wherein the first DCI indicates a configuration identifier (ID) of a first physical downlink shared channel (PDSCH) that activates the first PDSCH, the second DCI indicates a configuration ID of a second PDSCH that activates the second PDSCH, and the first PDSCH and the second PDSCH are semi-persistent scheduling (SPS) PDSCHs;
determine a first physical uplink control channel (PUCCH) resource corresponding to the first PDSCH, and determine a second PUCCH resource corresponding to the second PDSCH, wherein the first PUCCH resource is used to carry hybrid automatic repeat request (HARQ) feedback information of the first PDSCH, and the second PUCCH resource is used to carry HARQ feedback information of the second PDSCH; and
in response to the first PUCCH resource and the second PUCCH resource overlapping in time domain, and a priority of the first PDSCH being higher than a priority of the second PDSCH, receive the HARQ feedback information of the first PDSCH through the first PUCCH resource, and cancel receiving the HARQ feedback information of the second PDSCH through the second PUCCH resource, wherein the priority of the first PDSCH is equal to a priority of the HARQ feedback information of the first PDSCH, and the priority of the second PDSCH is equal to a priority of the HARQ feedback information of the second PDSCH.

8. The apparatus according to claim 7, wherein the instructions further cause the apparatus to:
determining a transmission periodicity of the first PDSCH based on the configuration ID of the first PDSCH, and determine a time-frequency resource of the first PDSCH based on the transmission periodicity of the first PDSCH and resource indication information in the first DCI; and
determining a transmission periodicity of the second PDSCH based on the configuration ID of the second PDSCH, and determine a time-frequency resource of the second PDSCH based on the transmission periodicity of the second PDSCH and resource indication information in the second DCI.

9. The apparatus according to claim 8, wherein the instructions further cause the apparatus to:
determine a time-frequency resource for first transmission of the first PDSCH based on the resource indication information in the first DCI, and determine the time-frequency resource of the first PDSCH based on the transmission periodicity of the first PDSCH and the time-frequency resource for the first transmission of the first PDSCH; and
determine a time-frequency resource for first transmission of the second PDSCH based on the resource indication information in the second DCI, and determine the time-frequency resource of the second PDSCH based on the transmission periodicity of the second PDSCH and the time-frequency resource for the first transmission of the second PDSCH.

10. The apparatus according to claim 8, wherein the instructions further cause the apparatus to:
send the first PDSCH on the time-frequency resource of the first PDSCH; and
send the second PDSCH on the time-frequency resource of the second PDSCH.

11. The apparatus according to claim 7, wherein the instructions further cause the apparatus to:
send a first higher layer parameter that is used in configuration of the first PDSCH and the priority of the first PDSCH; and
send a second higher layer parameter that is used in configuration of the second PDSCH and the priority of the second PDSCH.

12. The apparatus according to claim 7, wherein the priority of the HARQ feedback information of the first PDSCH is equal to a priority of the first PUCCH, and the priority of the HARQ feedback information of the second PDSCH is equal to a priority of the second PUCCH.

13. An apparatus comprising:
one or more processors; and
a non-transitory computer readable medium storing instructions that, when executed by the one or more processors, cause the apparatus to:
receive first downlink control information (DCI) and second DCI, wherein the first DCI indicates a configuration identifier (ID) of a first physical downlink shared channel (PDSCH) that activates the first PDSCH, the second DCI indicates a configuration ID of a second PDSCH that activates the second PDSCH, and the first PDSCH and the second PDSCH are semi-persistent scheduling (SPS) PDSCHs;
determine a first physical uplink control channel (PUCCH) resource corresponding to the first PDSCH, and determining a second PUCCH resource corresponding to the second PDSCH, wherein the first PUCCH resource is used to carry hybrid automatic repeat request (HARQ) feedback information of the first PDSCH, and the second PUCCH resource is used to carry HARQ feedback information of the second PDSCH; and
in response to the first PUCCH resource and the second PUCCH resource overlapping in time domain, and a priority of the first PDSCH being higher than a priority of the second PDSCH, send the HARQ feedback information of the first PDSCH through the first PUCCH resource, and cancel sending the HARQ feedback information of the second PDSCH through the second PUCCH resource, wherein the priority of the first PDSCH is equal to a priority of the HARQ feedback information of the first PDSCH, and the priority of the HARQ feedback information of the first PDSCH is equal to a priority of the first PUCCH, and the priority of the second PDSCH is equal to a priority of the HARQ feedback information of the second PDSCH, and the priority of the HARQ feedback information of the second PDSCH is equal to a priority of the second PUCCH.

14. The apparatus according to claim 13, wherein the instructions further cause the apparatus to:
determine a transmission periodicity of the first PDSCH based on the configuration ID of the first PDSCH, and determine a time-frequency resource of the first PDSCH based on the transmission periodicity of the first PDSCH and resource indication information in the first DCI; and
determine a transmission periodicity of the second PDSCH based on the configuration ID of the second PDSCH, and determine a time-frequency resource of the second PDSCH based on the transmission periodicity of the second PDSCH and resource indication information in the second DCI.

15. The apparatus according to claim 14, wherein the instructions further cause the apparatus to:
determine a time-frequency resource for first transmission of the first PDSCH based on the resource indication information in the first DCI, and determine the time-frequency resource of the first PDSCH based on the transmission periodicity of the first PDSCH and the time-frequency resource for the first transmission of the first PDSCH; and
determine a time-frequency resource for first transmission of the second PDSCH based on the resource indication information in the second DCI, and determine the time-frequency resource of the second PDSCH based on the transmission periodicity of the second PDSCH and the time-frequency resource for the first transmission of the second PDSCH.

16. The apparatus according to claim 14, wherein the instructions further cause the apparatus to:
receive the first PDSCH on the time-frequency resource of the first PDSCH, and generating the HARQ feedback information of the first PDSCH; and
receiving the second PDSCH on the time-frequency resource of the second PDSCH, and generating the HARQ feedback information of the second PDSCH.

17. The apparatus according to claim 13, wherein the instructions further cause the apparatus to:
receive, from a network device, a first higher layer parameter used in configuration of the first PDSCH and the priority of the first PDSCH; and
receive, from the network device, a second higher layer parameter used in configuration of the second PDSCH and the priority of the second PDSCH.

18. The apparatus according to claim 17, wherein the instructions further cause the apparatus to:
determine, according to the first higher layer parameter, the priority of the first PDSCH corresponding to the configuration ID of the first PDSCH; and
determine, according to the second higher layer parameter, the priority of the second PDSCH corresponding to the configuration ID of the second PDSCH.

* * * * *